(12) United States Patent
Watanabe et al.

(10) Patent No.: US 10,180,761 B2
(45) Date of Patent: Jan. 15, 2019

(54) TOUCH-PANEL-EQUIPPED DISPLAY DEVICE INCLUDING SIDE SURFACE ELECTRODES

(71) Applicant: Sharp Kabushiki Kaisha, Sakai, Osaka (JP)

(72) Inventors: Hisashi Watanabe, Sakai (JP); Tomohiro Kimura, Sakai (JP); Jean Mugiraneza, Sakai (JP); Yasuhiro Sugita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/319,969

(22) PCT Filed: Jun. 19, 2015

(86) PCT No.: PCT/JP2015/067693
§ 371 (c)(1),
(2) Date: Dec. 19, 2016

(87) PCT Pub. No.: WO2015/198977
PCT Pub. Date: Dec. 30, 2015

(65) Prior Publication Data
US 2017/0131811 A1 May 11, 2017

(30) Foreign Application Priority Data

Jun. 27, 2014 (JP) .................................. 2014-133176

(51) Int. Cl.
*G06F 3/044* (2006.01)
*G06F 3/041* (2006.01)
*G06F 1/16* (2006.01)

(52) U.S. Cl.
CPC ............ *G06F 3/044* (2013.01); *G06F 1/1626* (2013.01); *G06F 1/1643* (2013.01); *G06F 3/0416* (2013.01); *G06F 2203/04111* (2013.01)

(58) Field of Classification Search
CPC ........ G06F 3/041; G06F 3/0412; G06F 3/044; G06F 3/047; G06F 3/0416; G06F 3/046;
(Continued)

(56) References Cited

U.S. PATENT DOCUMENTS

2012/0032905 A1* 2/2012 Koshiyama ............. G06F 3/043
345/173
2013/0050139 A1* 2/2013 Gute ..................... G06F 1/1626
345/174
(Continued)

FOREIGN PATENT DOCUMENTS

| GB | 2 331 204 A | 5/1999 |
| JP | 11-143604 A | 5/1999 |
| JP | 2010-154090 A | 7/2010 |
| JP | 5347096 B1 | 11/2013 |
| WO | 2012/049942 A1 | 4/2012 |

OTHER PUBLICATIONS

Official Communication issued in International Patent Application No. PCT/JP2015/067693, dated Jul. 14, 2015.

*Primary Examiner* — Alexander Eisen
*Assistant Examiner* — Nelson C Lam
(74) *Attorney, Agent, or Firm* — Keating & Bennett, LLP

(57) ABSTRACT

Provided is a touch-panel-equipped display device that is capable of detecting a touch on a side surface of a case (1) at a high accuracy by a simple controlling operation, without any hardware such as expensive sensors being provided additionally. In the touch-panel-equipped display device, a side surface electrode part can be electrically connected by capacitive coupling with a Y-direction electrode part. A change in capacitive coupling when the side surface electrode part is touched by a finger or the like, therefore, is reflected in a sense signal acquired by the Y-direction
(Continued)

electrode part. In other words, in the touch-panel-equipped display device, a touch on the side surface electrode part can be detected using the sense signal. The touch-panel-equipped display device, therefore, is capable of detecting a touch on the side surface electrode part by using hardware and signal processing for touch detection in a conventional touch panel.

4 Claims, 20 Drawing Sheets

(58) Field of Classification Search
CPC ....... G06F 3/04886; G06F 2203/04101; G06F 2203/04104; G06F 2203/04108
USPC .................................................. 345/173–179
See application file for complete search history.

(56) References Cited

U.S. PATENT DOCUMENTS

| | | |
|---|---|---|
| 2013/0215060 A1 | 8/2013 | Nakamura |
| 2014/0132287 A1* | 5/2014 | Reynolds ................. G06F 3/044 324/686 |
| 2014/0267155 A1* | 9/2014 | Aubauer ............ G01R 27/2605 345/174 |
| 2015/0109243 A1* | 4/2015 | Jun .......................... G06F 3/044 345/174 |
| 2015/0160760 A1 | 6/2015 | Sato |
| 2015/0324056 A1* | 11/2015 | Sato ....................... G06F 3/0416 345/174 |
| 2016/0147365 A1* | 5/2016 | Yoshida .................. G06F 3/044 345/174 |
| 2016/0154509 A1* | 6/2016 | Yoshida .................. G06F 3/044 345/173 |

* cited by examiner

TOUCH-PANEL-EQUIPPED DISPLAY DEVICE INCLUDING SIDE SURFACE ELECTRODES

TECHNICAL FIELD

The present invention relates to a touch panel device or a touch-panel-equipped display device, for example, a touch panel device or a touch-panel-equipped display device that includes electrodes for touch detection on a side surface of a case thereof.

BACKGROUND ART

In recent years, in a portable terminal device on which a touch panel is mounted, a predetermined operation is performed generally by touching the touch panel arranged on the display surface of the portable terminal device. In such a portable terminal device, more various and convenient operation procedures are demanded. Besides, many users dislike having the display surface of the portable terminal device hidden behind fingers, or dislike having the display surface soiled by fingerprints. Therefore, a portable terminal device that has a function of performing a predetermined operation when a user touches a side surface or a back surface of the portable terminal device is desired.

Further, in order to cause a predetermined operation to be performed according to a user's hand holding the portable terminal device so that the operability is to be improved, or in order to prevent a malfunction that is caused by a user unintentionally touching the display surface of the portable terminal device, it is useful to develop techniques for providing sensors on a side surface or a back surface of the portable terminal device so as to cause the sensors to recognize the state of the user's hand holding the portable terminal device, so that the operability is improved or a malfunction prevention function is realized. For this purpose, techniques such as those disclosed in Patent Document 1 (JP-A-11(1999)-143604), Patent Document 2 (JP-A-2010-154090), and, Patent Document 3 (WO2012/049942) have been developed.

SUMMARY OF THE INVENTION

Problem to be Solved by the Invention

For example, in the techniques disclosed in Patent Document 1 or Patent Document 2, pressure sensors or light sensors are provided on a side surface of a portable terminal device, so that the operability is improved or a malfunction prevention function is realized. The pressure sensors are sensors that detect a pressure of a predetermined magnitude or greater. In order to for a touch of a user's finger or the like to be detected, a user should press the side surface of the portable terminal device on which the pressure sensors are arranged, with a pressure of a predetermined magnitude or greater. In other words, in a case of a portable terminal device in which pressure sensors are used, the pressure sensors do not react unless a user presses the side surface on which the pressure sensors are arranged, with a predetermined force or greater. The portable terminal device in which such pressure sensors are used, therefore, is unable to detect a soft touching by a user.

Further, in a case of a portable terminal device in which light sensors are used, an increase in the number of the light sensors provided therein enables to improve the touch detection accuracy, which enables to accurately detect the various states of a user's hand holding the portable terminal device. An increase in the number of light sensors provided in the portable terminal device, however, causes the production costs and the electric power consumption to increase. It is therefore not preferable to increase the number of light sensors provided in the portable terminal device with a view to improving the touch detection accuracy.

Still further, Patent Document 3 discloses techniques of detecting the various states of a user's hand holding a device by using touch sensors. According to the techniques disclosed in Patent Document 3, for example, electrostatic-capacitance-type touch sensors are provided on a side surface, so that various states of a user's hand holding a device can be detected. The techniques disclosed in Patent Document 3, however, require providing at least four touch sensors on an upper-side side surface of a portable terminal device, on a lower side surface thereof, on a left side surface, and on a right side surface, respectively. The techniques disclosed in Patent Document 3 therefore require complicated control for detecting a touched position.

Still further, according to the techniques disclosed in Patent Document 3, touch panels are provided on side surfaces of a portable terminal device, and this makes it necessary to provide spaces for providing touch panels on the side surfaces of the portable terminal device. In other words, in order to ensure spaces for providing touch panels, outer edge parts of the display surface of the portable terminal device have to be widened. This consequently causes the size of the display surface of the portable terminal device to decrease. In other words, in a case where a portable terminal device is realized with use of the techniques disclosed in Patent Document 3, areas of the outer edge parts of the display screen of the portable terminal device increase, which accordingly cause the size of the display screen to decrease. In the portable terminal device realized with use of the techniques disclosed in Patent Document 3, the display screen has a smaller size, which leads to poor operability on the display screen. Besides, in the portable terminal device realized with use of the techniques disclosed in Patent Document 3, the display screen has a smaller size and the outer edge parts of the display screen are wider, which makes it difficult to realize an appearance of excellent design.

In light of the above-described problems, it is an object of the present invention to realize a touch-panel-equipped display device that is capable of detecting a touch on a side surface of a case at a high accuracy by a simple controlling operation, without any hardware such as expensive sensors being provided additionally.

Means to Solve the Problem

In order to solve the above-described problems, the first configuration is directed to a touch-panel-equipped display device that includes a case, a display panel, a touch panel, and a side surface electrode part.

The display panel is provided in the case.

The touch panel includes an X-direction electrode part that is formed to extend in a first direction and is driven by a driving signal, and a Y-direction electrode part that is formed to extend in a second direction that intersects with the first direction, the Y-direction electrode part being intended to acquire a sense signal corresponding to an electric field change caused in the X-direction electrode part by the driving signal.

The side surface electrode part is arranged on the case. The side surface electrode part is provided in an area separated from the Y-direction electrode part on the touch panel, and can be electrically connected by capacitive coupling with the Y-direction electrode part on the touch panel.

Effect of the Invention

With the present invention, a touch-panel-equipped display device can be realized that is capable of detecting a touch on a side surface of a case at a high accuracy by a simple controlling operation, without any hardware such as expensive sensors being provided additionally.

MODE FOR CARRYING OUT THE INVENTION

Embodiment 1

Figure 1:
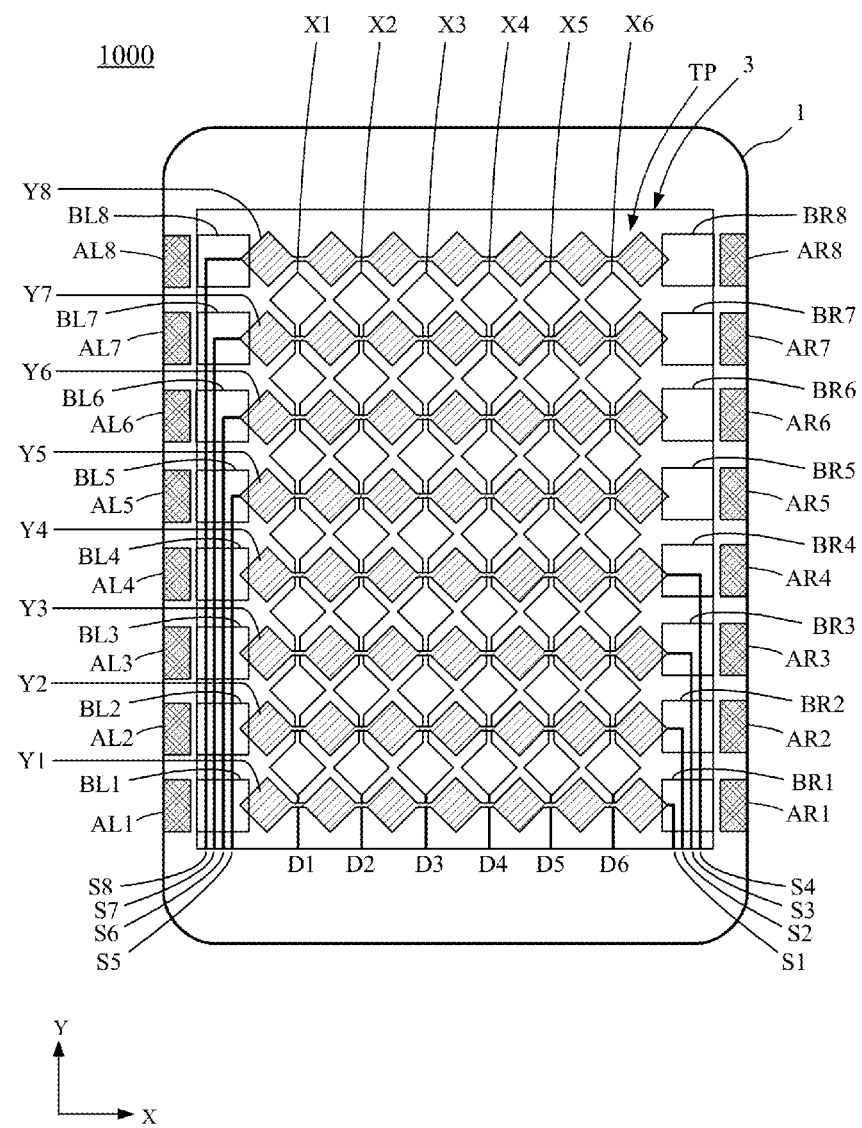
FIG. 1 schematically illustrates a schematic configuration of a touch-panel-equipped display device according to Embodiment 1.

The following description describes Embodiment 1 while referring to the drawings.

<1.1: Configuration of Touch-Panel-Equipped Display Device>

FIG. 1 schematically illustrates a schematic configuration (one example) of a touch-panel-equipped display device according to Embodiment 1.

More specifically, FIG. 1 is a plan view of a touch-panel-equipped display device 1000 (a plan view obtained when viewed from above the display surface). The X axis and the Y axis are set as illustrated in FIG. 1.

Figure 2:
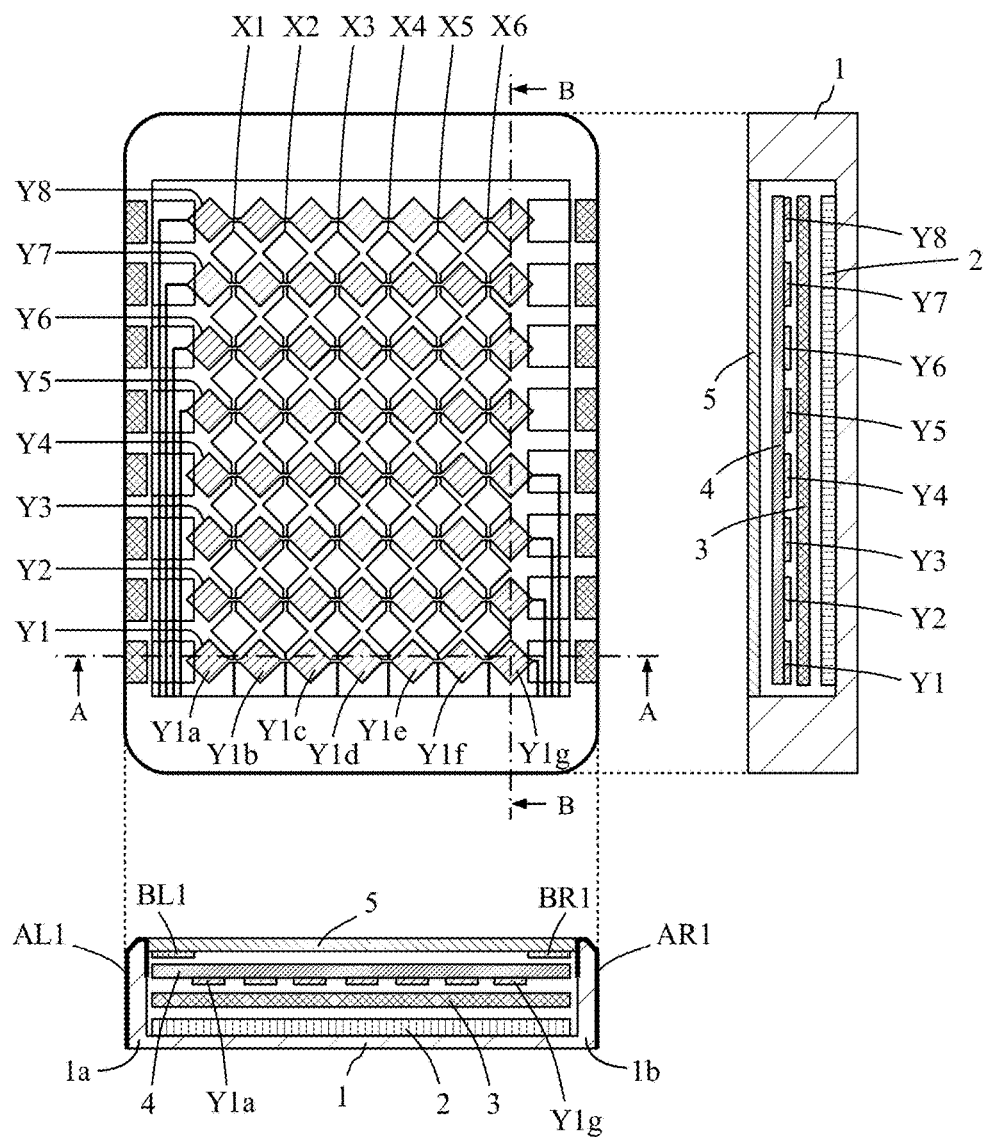
FIG. 2 illustrates a plan view of a touch-panel-equipped display device 1000, an A-A cross-sectional view taken along a line A-A (lower view), a B-B cross-sectional view taken along a line B-B (right view).

Further, FIG. 2 illustrates a plan view of the touch-panel-equipped display device 1000, an A-A cross-sectional view of the same taken along line A-A (lower view), and a B-B cross-sectional view of the same taken along line B-B (right view).

Figure 3:
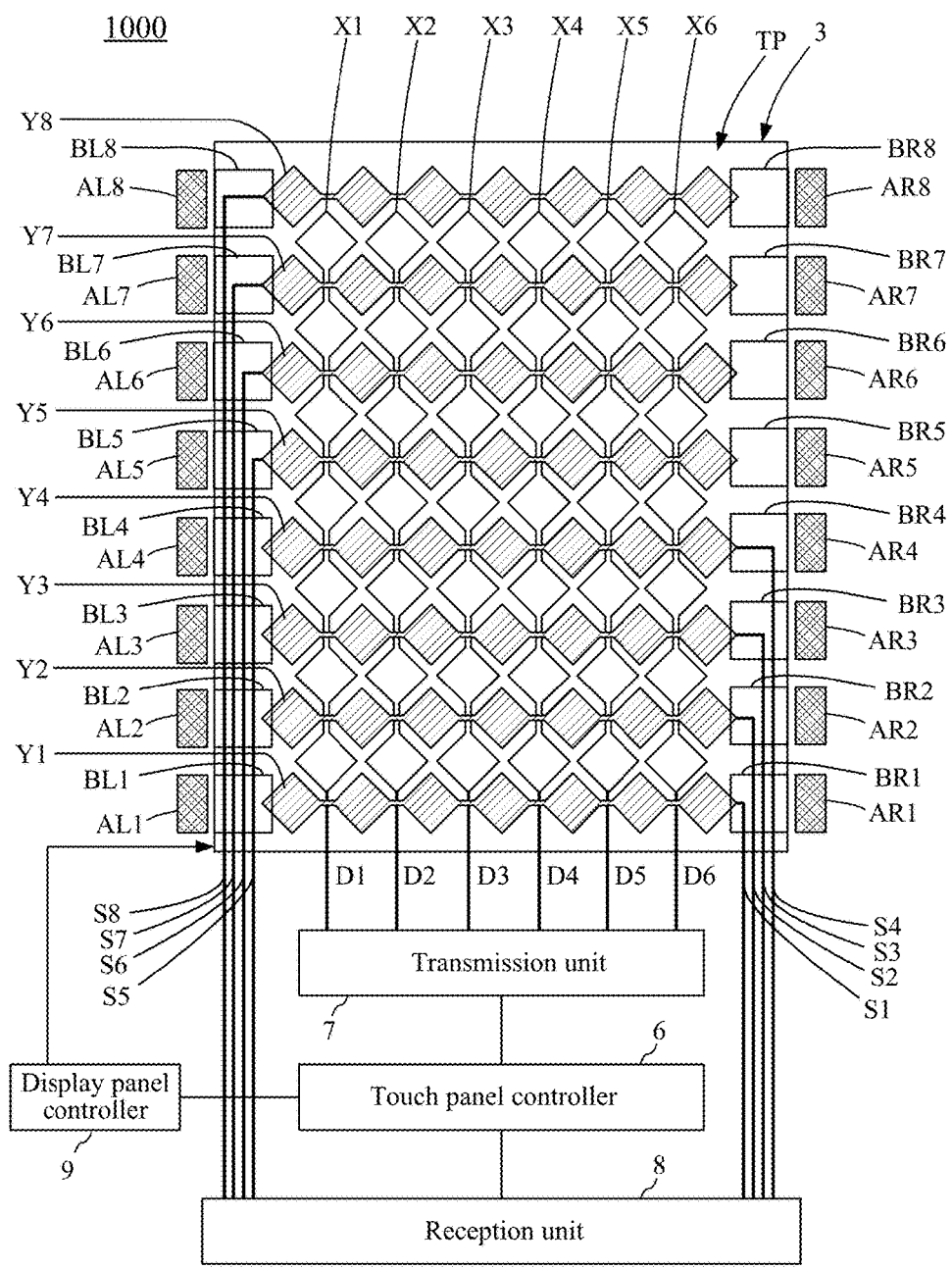
FIG. 3 schematically illustrates a schematic configuration of function blocks of the touch-panel-equipped display device 1000.

Still further, FIG. 3 schematically illustrates a schematic configuration of function blocks of the touch-panel-equipped display device 1000.

The touch-panel-equipped display device 1000, as illustrated in FIG. 1, includes a case 1, a touch panel TP, a display panel 3, first side surface electrodes AR1 to AR8, AL1 to AL8, and second side surface electrodes BR1 to BR8, BL1 to BL8.

Besides, the touch-panel-equipped display device 1000, as illustrated in FIG. 3, includes a touch panel controller 6 for controlling the touch panel TP, a transmission unit 7 that transmits driving signals to X-direction electrodes X1 to X6 of the touch panel TP via drive lines D1 to D6, and a reception unit 8 that receives signals corresponding to electric field changes in the X-direction electrodes X1 to X6 and Y-direction electrodes Y1 to Y8, via sense lines S1 to S8. Further, the touch-panel-equipped display device 1000, as illustrated in FIG. 3, includes a display panel controller 9 for controlling the display panel.

The case 1 is configured to house the following in the inside thereof, as illustrated in FIG. 2: a circuit part 2 that includes a circuit board, a battery, and the like; a display panel 3 (for example, a liquid crystal display panel device); a touch panel TP (a substrate 4 for a touch panel, the substrate 4 being made of a transparent material, X-direction electrodes X1 to X6, and Y-direction electrodes Y1 to Y8); and second side surface electrodes BR1 to BR8, BL1 to BL8.

Further, as illustrated in an A-A cross-sectional view in FIG. 2, the case 1 has the following configuration: on one of side surfaces between which the display surface (the display surface of the display panel 3) is interposed, the first side surface electrodes AR1 to AR8 are formed; and the other one of the side surfaces between which the display surface is interposed, the first side surface electrodes AL1 to AL8 are formed.

Still further, as illustrated in FIG. 2, a transparent cover 5 (a cover 5 made of an insulating material) is mounted on the case 1, whereby dirt, dust and the like is prevented from entering the inside of the case 1.

As illustrated in FIGS. 1 to 3, the touch panel TP includes the X-direction electrodes X1 to X6 and the Y-direction electrodes Y1 to Y8. Further, the driving of the touch panel TP is controlled by the touch panel controller 6, the transmission unit 7, and the reception unit 8.

The X-direction electrodes X1 to X6 are, for example, transparent electrodes (electrodes having a high light transmittance) formed with indium tin oxide (ITO). The X-direction electrodes X1 to X6 are formed on the substrate 4 for the touch panel TP. Each of the X-direction electrodes X1 to X6 is formed with a plurality of sense electrode portions (rhombic-shaped sense electrode portions in FIGS. 1 to 3), and bridge portions (long and thin rectangular portions in FIGS. 1 to 3) that electrically connect adjacent ones of the sense electrode portions. The X-direction electrodes X1 to X6 are, as illustrated in FIGS. 1 to 3, arrayed in the Y direction (in the horizontal direction in FIGS. 1 to 3), which is a direction that intersects at a right angle with a direction in which the sense electrode portions are connected by the bridge portions so as to extend, in such a manner that the X-direction electrodes X1 to X6 are separated at predetermined distances from one another.

The X-direction electrodes X1 to X6 are connected to the drive lines D1 to D6, respectively. The drive lines D1 to D6, then, are connected to the transmission unit 7.

The Y-direction electrodes Y1 to Y8 are transparent electrodes (electrodes having a high light transmittance) formed with, for example, indium tin oxide (ITO). The Y-direction electrodes Y1 to Y8 are formed on the substrate 4 for the touch panel TP. The Y-direction electrodes Y1 to Y8 are formed on the substrate 4 for the touch panel TP, without being in contact with the X-direction electrodes X1 to X6. Each of the Y-direction electrodes Y1 to Y8 is formed with a plurality of sense electrode portions (rhombic-shaped sense electrode portions in FIGS. 1 to 3), and bridge portions (long and thin rectangular portions in FIGS. 1 to 3) that electrically connect adjacent ones of the sense electrode portions. The Y-direction electrodes Y1 to Y8 are, as illustrated in FIGS. 1 to 3, arrayed in the X-direction (in the vertical direction in FIGS. 1 to 3), which is a direction that intersects at a right angle with a direction in which the sense electrode portions are connected by the bridge portions so as to extend, in such a manner that the Y-direction electrodes Y1 to Y8 are separated at predetermined distances from one another.

The Y-direction electrodes Y1 to Y8 are connected to the sense lines S1 to S8, respectively. The sense lines S1 to S8, then, are connected to the reception unit 8.

The touch panel controller 6 is connected to the transmission unit 7 and the reception unit 8, and constitutes a functional part that controls the touch panel TP.

The touch panel controller 6 controls the transmission unit 7 so that a driving pulse signal is output to the drive lines D1 to D6 in order by the transmission unit 7.

Further, the touch panel controller 6 controls the reception unit 8 so that the reception unit 8 receives sense signals from the sense lines S1 to S8 so as to detect an electric field change in the sense electrode portions of the X-direction electrodes and the sense electrode portions of the Y-direction electrodes. The touch panel controller 6 identifies the touched position based on the detection result acquired by the reception unit 8.

Further, as illustrated in FIG. 3, the touch panel controller 6 is connected with the display panel controller 9, and outputs a signal that contains information relating to the detected touched position to the display panel controller 9 as required.

The transmission unit 7 outputs a driving pulse signal to the drive lines D1 to D6 in order, based on instructions from the touch panel controller 6.

Based on instructions from the touch panel controller 6, the reception unit 8 receives sense signals via the sense lines S1 to S8, and detects an electric field change in the sense electrode portions of the X-direction electrodes and the sense electrode portions of the Y-direction electrodes based on the received sense signals. Then, the reception unit 8 outputs a signal indicating the detection result to the touch panel controller 6.

The display panel 3 is, for example, a display panel in which liquid crystal, organic EL, or the like is used (a liquid crystal display panel, or an organic EL display panel). As illustrated in FIG. 3, the display panel 3 is connected to the display panel controller 9, and the driving of the same is controlled by the display panel controller 9. With the driving of the display panel 3 controlled by the display panel controller 9, images and the like, for example, are displayed on the display panel 3.

When viewed in a cross section as illustrated in FIG. 2, the display panel 3 is arranged between the circuit part 2 in which a circuit board, a battery, and the like are housed, and the touch panel TP (the substrate 4 for the touch panel TP)

Since the cover 5 and the touch panel TP are made of transparent materials, the display on the display panel 3 can be viewed from above on the cover 5 side.

The first side surface electrodes AR1 to AR8, AL1 to AL8 are made of a conductive material. As illustrated in FIGS. 1 to 3, when viewed in a plan view, the first side surface electrodes AR1 to AR8, AL1 to AL8 are arranged at ends of the case so that the Y-direction electrodes Y1 to Y8 are interposed between the first side surface electrodes AR1 to AR8 and AL1 to AL8, respectively. The first side surface electrodes AR1 to AR8, AL1 to AL8 are formed to cover a part of side walls of case 1 in a cross sectional view, as illustrated in the lower view in FIG. 2.

More specifically, as illustrated in the A-A cross-sectional view in FIG. 2, the first side surface electrode AL1 is formed to, when viewed in the A-A cross section, cover an entirety of the outer surface of the side wall portion 1a of the case 1, cover a cover 5-provided side end of the side wall portion 1a of the case 1, and cover a part of an inner side of the side wall portion 1a of the case 1. Here, the first side surface electrode AL1 is formed to cover a part of the inner side of the side wall portion 1a of the case 1 in such a manner that the first side surface electrode AL1 and the second side surface electrode BL1 are arranged in such proximity that they are capacitively coupled with each other.

Further, as illustrated in the A-A cross-sectional view in FIG. 2, the first side surface electrode AR1 is formed to, when viewed in the A-A cross section, cover an entirety of the outer surface of the side wall portion 1b of the case 1, cover a cover 5-provided side end of the side wall portion 1b of the case 1, and cover a part of an inner side of the side wall portion 1b of the case 1. Here, the first side surface electrode AR1 is formed to cover a part of the inner side of the side wall portion 1b of the case 1 in such a manner that the first side surface electrode AR1 and the second side surface electrode BR1 are arranged in such proximity that they are capacitively coupled with each other.

In addition to these first side surface electrodes AR1, AL1, the other first side surface electrodes AR2 to AR8, AL2 to AL8 are also configured in the same manner as described above.

The first side surface electrodes AR1 to AR8, AL1 to AL8 do not have to be electrodes made of a transparent material, since they are formed on the side surfaces of the case 1. These may be made of, for example, copper foils, or the like.

The first side surface electrodes AR1 to AR8, AL1 to AL8 may be formed on the side surfaces of the case 1 by, for example, the laser direct structuring (LDS) method, depending on the shapes of the side surfaces of the case 1.

Further, the first side surface electrodes AR1 to AR8, AL1 to AL8 may be formed on the side surfaces of the case 1 by, for example, a three-dimensional printing technique such as screen process printing, pad printing, ink-jet printing, or heat transfer, depending on the shapes of the side surfaces of the case 1.

The second side surface electrodes BR1 to BR8, BL1 to BL8 is formed with a conductive material. As illustrated in FIGS. 1 to 3, when viewed in a plan view, the second side surface electrodes BR1 to BR8, BL1 to BL8 are arranged at ends of the case so that the Y-direction electrodes Y1 to Y8 are interposed between the second side surface electrodes BR1 to BR8 and BL1 to BL8, respectively. The second side surface electrodes BR1 to BR8, BL1 to BL8, when viewed in a plan view, are arranged on inner sides of the locations where the first side surface electrodes AR1 to AR8, AL1 to AL8 are arranged. The second side surface electrode BR1 and the first side surface electrode AR1 are arranged in such proximity that they are capacitively coupled with each other. Further, the second side surface electrode BL1 and the first side surface electrode AL1 are arranged in such proximity that they are capacitively coupled with each other. Similarly, the second side surface electrodes BR2 to BR8 and the first side surface electrodes AR2 to AR8 are arranged in such proximity that they are capacitively coupled with each other, respectively. Further, similarly, the second side surface electrodes BL2 to BL8 and the first side surface electrodes AL2 to AL8 are arranged in such proximity that they are capacitively coupled with each other, respectively.

The second side surface electrodes BR1 to BR8, BL1 to BL8 are, for example, transparent electrodes formed with indium tin oxide (ITO) (electrodes having a high light transmittance). Since the second side surface electrodes BR1 to BR8, BL1 to BL8 are arranged at end areas of the display surface, the areas thereof blocking light from the display panel are small, and therefore they may be formed with a conductive material having a low light transmittance.

For convenience of description, FIGS. 1 to 3 illustrate a schematic configuration of the touch-panel-equipped display device 1000. Therefore, the numbers of the first side surface electrodes AR, AL (the first side surface electrodes AR1 to ARn (n: natural number), AL1 to ALn (n: natural number) are collectively referred to as the first side surface electrodes AR, AL), the second side surface electrodes BR, BL (the second side surface electrodes BR1 to BRn (n: natural number), BL1 to BLn (n: natural number) are collectively referred to as the second side surface electrodes BR, BL), the X-direction electrodes X1 to Xm (m: natural number), and the Y-direction electrodes Y1 to Yn (n: natural number), arranged in the touch-panel-equipped display device 1000, are not limited to the numbers in the case illustrated in FIGS. 1 to 3 (the numbers of "n" and "m" may be greater than those described above).

Further, in FIGS. 1 to 3, for convenience of description, the respective sizes of the members of the touch-panel-equipped display device 1000, the ratios thereof, and the like, are different from the actual ones, in some parts.

Figure 4:
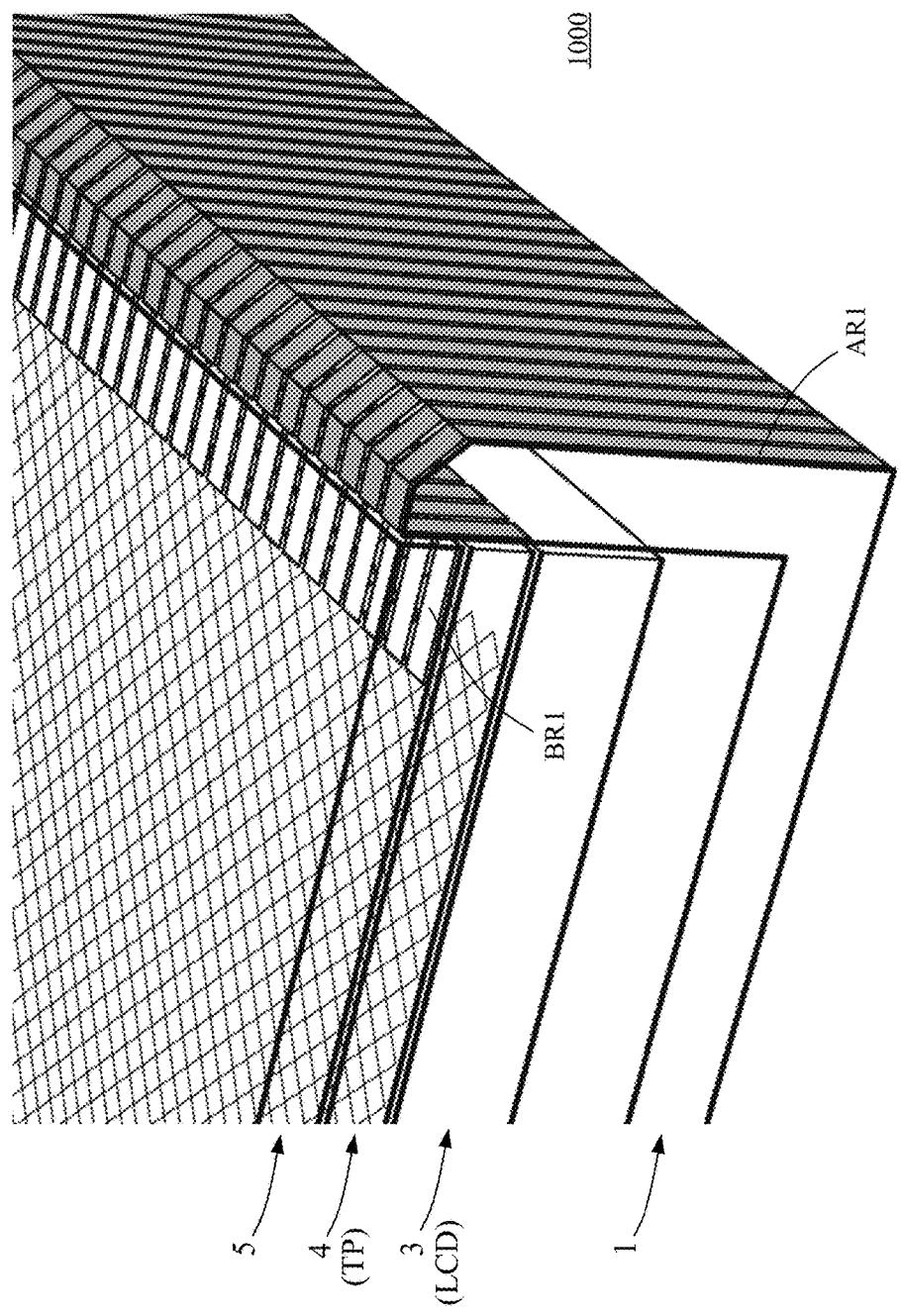
FIG. 4 illustrates an actual example (one example) of the configuration of the touch-panel-equipped display device 1000.

FIG. 4 illustrates an actual exemplary configuration (one example) of the touch-panel-equipped display device 1000. More specifically, FIG. 4 is a cross-sectional perspective view (partial) (a cross-sectional perspective view taken along a line corresponding to the line A-A in FIG. 2) of the touch-panel-equipped display device 1000 in which an area including the first side surface electrode AR1 and the second side surface electrode BR1 is enlarged for illustration.

Figure 5:
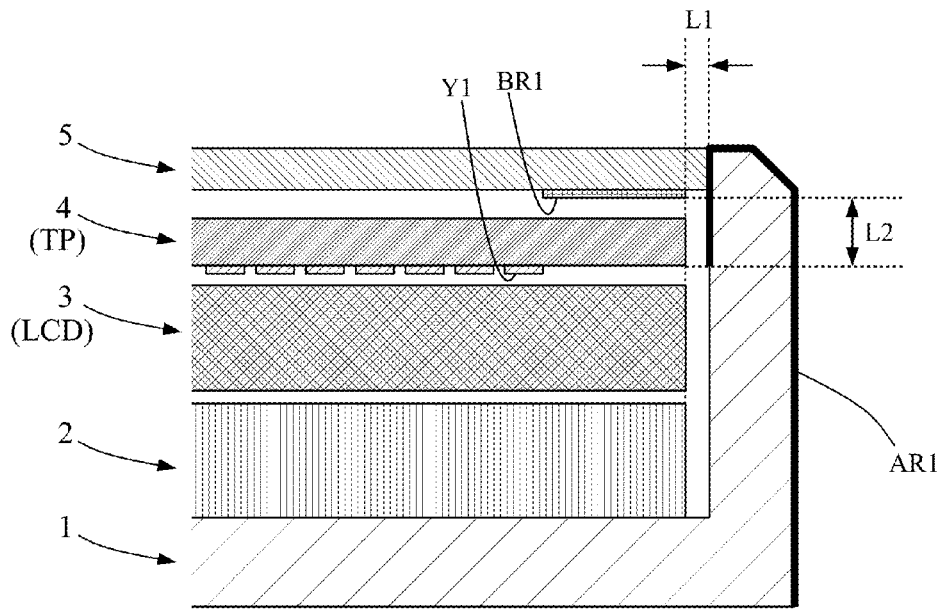
FIG. 5 illustrates an enlarged view of an area that includes a first side surface electrode AR1 and a second side surface electrode BR1 of the touch-panel-equipped display device 1000.

Further, FIG. 5 is a view (cross-sectional view) illustrating an area including the first side surface electrode AR1 and the second side surface electrode BR1 of the touch-panel-equipped display device 1000 illustrated in FIG. 4, the area being enlarged and illustrated.

As illustrated in FIG. 5, when viewed in a cross section, a distance L1 between the first side surface electrode AR1 and the second side surface electrode BR1 is set to such a distance that the first side surface electrode AR1 and the second side surface electrode BR1 can be capacitively coupled. For example, the distance L1 is preferably 2 mm or less. The distance L1 is further preferably 1 mm or less. The lower limit of the distance L1 is preferably about 0.1 mm in view of the assembly tolerance of the touch-panel-equipped display device 1000, but in a case where the tolerance is not taken into consideration, the distance may be set to 0 mm (a state in which the first side surface electrode AR1 and the second side surface electrode BR1 are in contact with each other).

Another distances Lk between a first side surface electrodes ARk (k: natural number) and a second side surface electrodes BRk is also set in the same manner as described above.

Further, as illustrated in FIG. 5, when viewed in a cross section, a distance L2 between the second side surface electrode BR1 and the Y-direction electrode Y1 is set to such a distance that the second side surface electrode BR1 and the Y-direction electrode Y1 can be capacitively coupled. For example, the distance L2 is preferably 2 mm or less. The distance L2 is further preferably 1 mm or less.

Further, as illustrated in FIG. 5, regarding the first side surface electrode AR1, a conductive portion thereof formed so as to be along an inner side wall portion of the case 1 is preferably not extended to the display panel 3 (for example, a surface of the display panel 3 where the driving elements such as TFTs are formed) or the side surface of the circuit part 2 (a part that includes the circuit board). If the conductive portion of the first side surface electrode AR1 is formed up to the display panel 3 or the side surface of the circuit part 2, malfunctions are possibly caused by electric noises emitted from driving elements such as TFTs formed in the display panel 3 and the circuit board in some cases.

The conductive portion of the first side surface electrode AR1 formed along the inner side wall portion of the case 1, therefore, may be formed up to a surface on which the second side surface electrode BR1 or the Y-direction electrode Y1 capacitively coupled.

<1.2: Action of Touch-Panel-Equipped Display Device>

Actions of the touch-panel-equipped display device 1000 configured as described above are described below.

The following description describes a more specific example in a case where a user's finger or the like touches the first side surface electrode AR1 of the touch-panel-equipped display device 1000.

Figure 6:
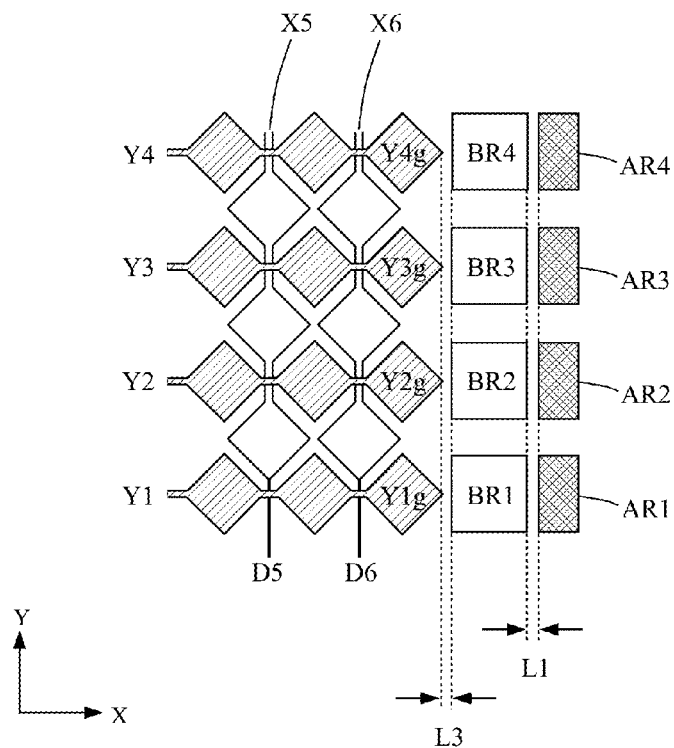
FIG. 6 schematically illustrates a part of the touch panel TP (a part of X-direction electrodes X5, X6, and a part of Y-direction electrodes Y1 to Y4), first side surface electrodes AR1 to AR4, and second side surface electrodes BR1 to BR4, which are extracted from the touch-panel-equipped display device 1000.

FIG. 6 schematically illustrates a part of the touch panel TP (a part of X-direction electrodes X5, X6, and a part of Y-direction electrodes Y1 to Y4), first side surface electrodes AR1 to AR4, and second side surface electrodes BR1 to BR4, which are extracted from the touch-panel-equipped display device 1000.

In the touch-panel-equipped display device 1000, the first side surface electrode AR1 and the second side surface electrode BR1 are arranged to be separated from each other at a distance L1 as illustrated in FIG. 6, and the distance L1 is set to such a distance that these can be capacitively coupled with each other.

Further, in the touch-panel-equipped display device 1000, the second side surface electrode BR1 and the Y-direction electrode Y1 are arranged to be separated from each other at a distance L3 as illustrated in FIG. 6, and the distance L3 is set to such a distance that these can be capacitively coupled with each other. The distance L3 does not have to be a distance within the same plane surface, but may be a three-dimensional distance. The distance L3, for example, may be equivalent to the distance L2 in the normal line direction of the display surface, as illustrated in FIG. 5.

Further, the first side surface electrodes AR1 and AR2 are preferably arranged to be separated at such a distance that the first side surface electrodes AR1 and AR2 are not capacitively coupled (for example, 1 mm or more, preferably 2 mm or more). This applies to the other adjacent first side surface electrodes. Further, the second side surface electrodes BR1 and BR2 are preferably arranged to be separated at such a distance that the second side surface electrodes BR1 and BR2 are not capacitively coupled (for example, 1 mm or more, preferably 2 mm or more). This also applies to the other adjacent second side surface electrodes.

When a user has touched the first side surface electrode AR1 with a finger, since the first side surface electrode AR1 and the second side surface electrode BR1 are capacitively coupled and the second side surface electrode BR1 and the Y-direction electrode Y1 are capacitively coupled, a capacitance change caused by a touch of the user's finger can be detected by the Y-direction electrode Y1.

More specifically, when the transmission unit 7 transmits a driving pulse signal to the X-direction electrode X6 via the drive line D6, a capacitance change caused by the touch of the user's finger occurs in the first side surface electrode AR1, the second side surface electrode BR1, and the Y-direction electrode Y1 (a sense electrode portion Y1g of the Y-direction electrode Y1). This capacitance change causes an electric field change, and a sense signal corresponding to this electric field change is output from the Y-direction electrode Y1 via the sense line S1 to the reception unit 8.

Then, the touch panel controller 6 determines that a sense signal received via the sense line S1 when the drive line D6 is driven is a signal that indicates that an electric field change is detected. This allows the touch panel controller 6 to detect that the user has touched the first side surface electrode AR1.

In a case where the user touches the portion of the sense electrode Y1g in the Y-direction electrode Y1, the touch panel controller 6 also determines that a sense signal received via the sense line S1 when the drive line D6 is driven is a signal that indicates that an electric field change is detected. In a case where the user touches the first side surface electrode AR1, an electric field change occurring to the sense electrode Y1g of the Y-direction electrode Y1 is caused by a capacitance change via capacitance coupling by the first side surface electrode AR1, the second side surface electrode BR1, and the Y-direction electrode Y1. The electric field change occurring to the sense electrode Y1g of the Y-direction electrode Y1 in a case where the user is touching the first side surface electrode AR1, therefore, is smaller than the electric field change occurring in a case where the user is touching the portion of the sense electrode Y1g of the Y-direction electrode Y1.

The touch panel controller 6, therefore, may be configured to (1) determine that the user is touching the portion of the sense electrode Y1g of the Y-direction electrode Y1, in a case where a signal amplitude of a sense signal received via the sense line S1 when the drive line D6 is driven is greater than a first threshold value Th1, and greater than a second threshold value Th2 (Th2>Th1), and (2) determine that the user is touching the first side surface electrode AR1, in a case where a signal amplitude of a sense signal received via the sense line S1 when the drive line D6 is driven is greater than the first threshold value Th1 and equal to or smaller than the second threshold value Th2 (Th2>Th1).

The detection of a touch on the first side surface electrodes AR other than the first side surface electrode AR1 also can be performed by the same processing as described above.

In this way, in the touch-panel-equipped display device 1000, the detection of a touch on the first side surface electrodes AR, AL can be performed by using the same hardware configuration and the same signal processing as those or a touch-panel-equipped display device that does not include the first side surface electrodes AR, AL and the second side surface electrodes BR, BL.

Further, in the touch-panel-equipped display device 1000, the same number of the first side surface electrodes AR, AL as the number of the Y-direction electrodes of the touch panel TP are provided on both sides of the display surface, which enables to detect a touch on side surfaces of the case at a high accuracy (at a level equal to the level of detection accuracy on the display surface of the touch panel TP).

Still further, in the touch-panel-equipped display device 1000, only providing the first side surface electrodes AR, AL on side surfaces of the case, and the second side surface electrodes BR, BL on the cover 5 is required, and an expensive sensor for detecting a touch on a side surface of the case does not have to be additionally provided. Further, as described above, as a hardware configuration for detecting a touch on a side surface of the case, the same hardware configuration as that of the conventional touch panel device may be used.

As described above, in the case of the touch-panel-equipped display device 1000, a touch on a side surface of the case can be detected at a high accuracy by a simple controlling operation (the same controlling operation as that of the conventional touch panel), without hardware such as expensive sensors being additionally provided.

Modification Example 1

The following description describes Modification Example 1 of Embodiment 1.

Descriptions of parts identical to those in the above-described embodiment are omitted.

In the touch-panel-equipped display device 1000 of Embodiment 1, as illustrated in FIG. 6, pitches (clearances in the Y-axis direction) for the Y-direction electrodes Y1 to Y8, the first side surface electrodes AR1 to AR8, AL1 to AL8, and, the second side surface electrodes BR1 to BR8, BL1 to BL8 are uniform, and Y-coordinates of the positions of the center points in the Y-axis direction of these are approximately identical to one another. This enables to improve the accuracy of detection of a touched point on a side surface of the case 1.

In some cases, however, the Y-coordinates of the positions of the center points in the Y-axis direction of the Y-direction electrodes Y1 to Y8, the first side surface electrodes AR1 to AR8, AL1 to AL8, and the second side surface electrodes BR1 to BR8, BL1 to BL8 cannot be made approximately identical to one another, due to manufacturing errors and the like of the touch-panel-equipped display device.

Figure 7:
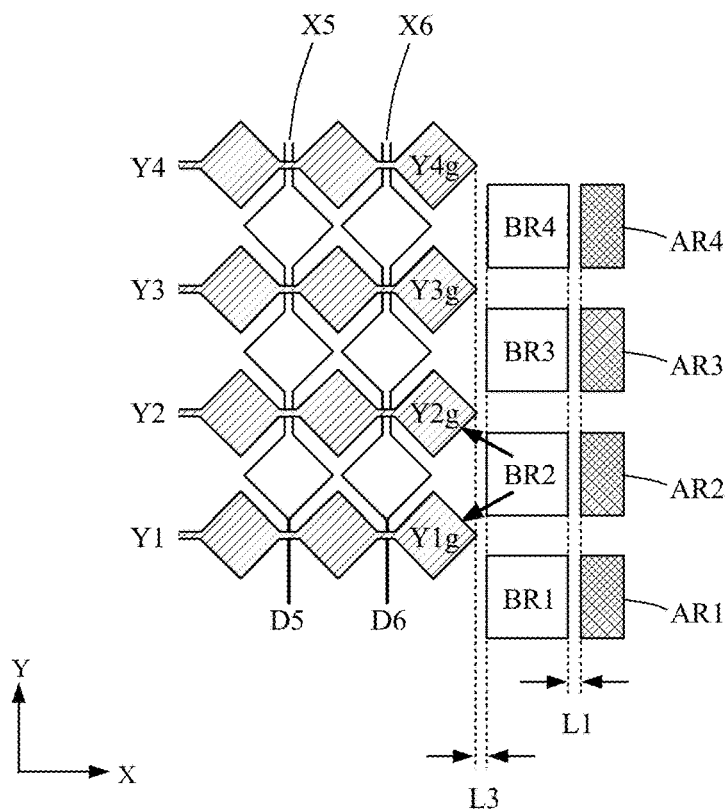
FIG. 7 is a view for describing a change in capacitive coupling in a case where the first side surface electrode is touched.

As illustrated in FIG. 7, for example, in a case where the arrangement is such that the Y-coordinates of the positions of the center points in the Y-axis direction of the Y-direction electrodes Y1 to Y8, and the Y-coordinates of the positions of the center points in the Y-axis direction of the first side surface electrodes AR1 to AR8, AL1 to AL8 and the second side surface electrodes BR1 to BR8, BL1 to BL8, are offset from each other by half of the pitch in the Y-axis direction, accuracy of the detection of a touched point on a side surface of the case 1 deteriorates.

To cope with this, the touch-panel-equipped display device of the present modification example is configured to ensure the touched point detection accuracy, even in a case where displacement occurs in the electrodes arrangement, as described above.

For example, in a case where the first side surface electrode AR2 in FIG. 7 is touched by a finger, the first side surface electrode AR2, the second side surface electrode BR2, and the Y-direction electrode Y2 (the sense electrode portion Y2g) are capacitively coupled, and the first side surface electrode AR2, the second side surface electrode BR2, and the Y-direction electrode Y1 (sense electrode portion Y1g) are capacitively coupled. Then, as illustrated in FIG. 7, since the distance between the second side surface electrode BR2 and the sense electrode portion Y2g, and the distance between the second side surface electrode BR2 and the sense electrode portion Y1g are approximately identical to each other, the degrees of the two above-described capacitive couplings are identical.

In the case illustrated in FIG. 7, therefore, when the first side surface electrode AR2 is touched by a finger, the transmission unit 7 transmits a driving pulse signal via the drive line D6 to the X-direction electrode X6, a capacitance change caused by the touch of the user's finger occurs to the first side surface electrode AR2, the second side surface electrode BR2, and the Y-direction electrode Y2 (the sense electrode portion Y2g of the Y-direction electrode Y2). This capacitance change causes an electric field change, and a sense signal corresponding to this electric field change is output from the Y-direction electrode Y2 via the sense line S2 to the reception unit 8.

Further, in this case, a capacitance change caused by the touch of the user's finger occurs to the first side surface electrode AR2, the second side surface electrode BR2, and the Y-direction electrode Y1 (the sense electrode portion Y1g of the Y-direction electrode Y1) as well. This capacitance change causes an electric field change, and a sense signal corresponding to this electric field change is output from the Y-direction electrode Y1 via the sense line S1 to the reception unit 8.

In a case where, when the drive line D6 is driven, the sense signal received via the sense line S1, and the sense signal received via the sense line S2 are signals having identical amplitudes, the touch panel controller 6 determines that a first side surface electrode arranged at a position having a Y coordinate that is approximately identical to the Y-coordinate of the midpoint between the center point in the Y-axis direction of the Y-direction electrode Y1 and the center point in the Y-axis direction of the Y-direction electrode Y2 is touched.

With this processing, as described above, even in a case where displacement occurs due to manufacturing errors, the touched point detection accuracy can be ensured.

Figure 8:
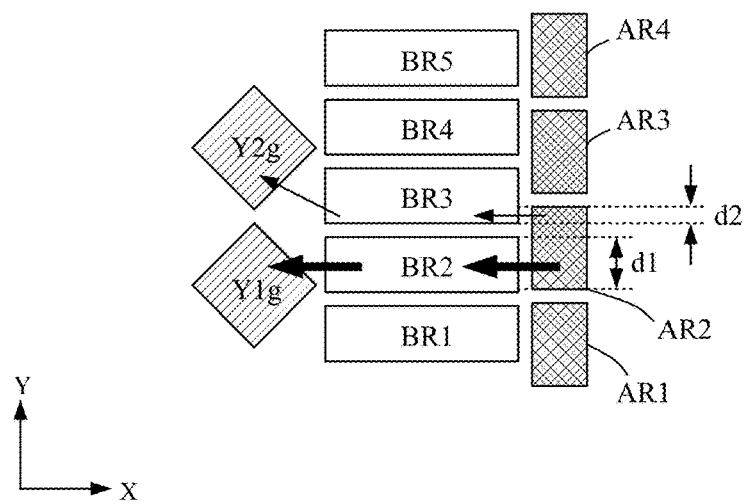
FIG. 8 is a view for describing a change in capacitive coupling in a case where the first side surface electrode is touched.

Further, in order to ensure the touched point detection accuracy even in a case where displacement occurs due to manufacturing errors, the configuration may be such that the pitch (the array interval in the Y-axis direction) of the Y-direction electrodes, the pitch (the array interval in the Y-axis direction) of the first side surface electrodes AR, AL, and the pitch (the array interval in the Y-axis direction) of the second side surface electrodes BR, BL are different, in the touch-panel-equipped display device, as illustrated in FIG. 8.

For example, the pitch (the array interval in the Y-axis direction) of the Y-direction electrodes, the pitch (the array interval in the Y-axis direction) of the first side surface electrodes AR, AL, and the pitch (the array interval in the Y-axis direction) of the second side surface electrodes BR, BL are set at least in such a manner that an arbitrary one of the above-described pitches should not be an integer multiple of either one of the other two pitches.

This makes it possible to determine that the first side surface electrode that is located at a position having a Y-coordinate approximately identical to that of the Y-direction electrode connected to the sense line that receives the sense signal indicating the detection of an electric field change is a touched position.

For example, in the case illustrated in FIG. 8, the ratio of the pitch of the Y-direction electrodes Y1, Y2, the pitch of the first side surface electrodes AR1 to AR4, and the pitch of the second side surface electrodes BR1 to BR5 is set to "2:1:1.4".

As illustrated in FIG. 8, the width of the range in which the Y-coordinate position of the first side surface electrode AR2 and that of the second side surface electrode BR2 overlap is d1, and the width of the range in which the Y-coordinate position of the first side surface electrode AR2 and that of the second side surface electrode BR3 overlap is d2 (d2<d1).

In other words, in the case of the arrangement as illustrated in FIG. 8, an electrostatic capacitance between the first side surface electrode AR2 and the second side surface electrode BR2 is greater than an electrostatic capacitance between the first side surface electrode AR2 and the second side surface electrode BR3. Regarding the capacitance changes in a case where the first side surface electrode AR2 is touched by a finger, therefore, a greater capacitance change occurs to the second side surface electrode BR2 and the Y-direction electrode Y1 (the sense electrode portion Y1g) arranged close to the second side surface electrode BR2, a smaller capacitance change occurs to the second side surface electrode BR3 and the Y-direction electrode Y2 (the sense electrode portion Y2g) arranged close to the second side surface electrode BR3.

In other words, in the case illustrated in FIG. 8, in a case where the first side surface electrode AR2 is touched, the sense signal received by the sense line S1 connected to the Y-direction electrode Y1 has a greater amplitude, whereas the sense signal received by the sense line S2 connected to the Y-direction electrode Y2 has a smaller amplitude.

The touch panel controller 6, therefore, by detecting the sense signal having a greater amplitude, determines that the first side surface electrode at a position having Y-coordinates approximately identical to those of the Y-direction electrode connected to the sense line that receives the sense signal is touched.

In this way, by varying the pitch of the Y-direction electrodes Y1, Y2, the pitch of the first side surface electrodes AR1 to AR4, and the pitch of the second side surface electrodes BR1 to BR5, the probability of approximately identical electric field changes occurring two adjacent Y-direction electrodes, as when offset of half pitch occurs, can be reduced.

As described above, therefore, by intentionally varying the pitch of the Y-direction electrodes, the pitch of the first side surface electrodes, and the pitch of the second side surface electrodes, a touched position can be detected at a high accuracy, by simply detecting a sense signal having a greater amplitude in the touch panel controller 6.

The setting of the ratio of the pitch of the Y-direction electrodes, the pitch of the first side surface electrodes, and the pitch of the second side surface electrodes is not limited to that described above, and the ratio may be set differently.

Modification Example 2

The following description describes Modification Example 2 of Embodiment 1.

Detailed descriptions of parts identical to those in the above-described examples are omitted. The parts identical to those in the above-described examples are denoted by the same reference numerals.

Figure 9:
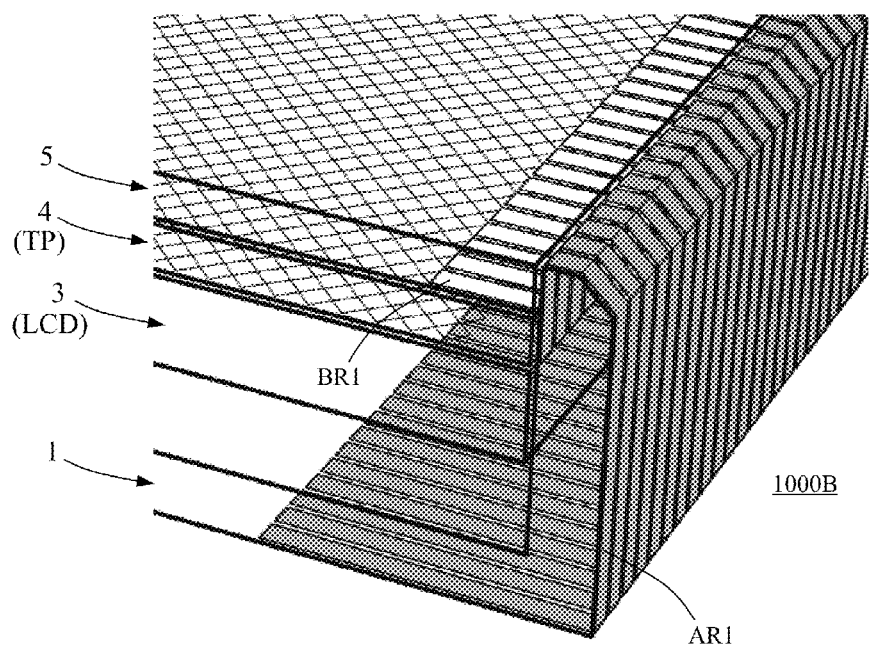
FIG. 9 illustrates an exemplary configuration of a touch-panel-equipped display device 1000B according to Modification Example 2 of Embodiment 1.
Figure 9:
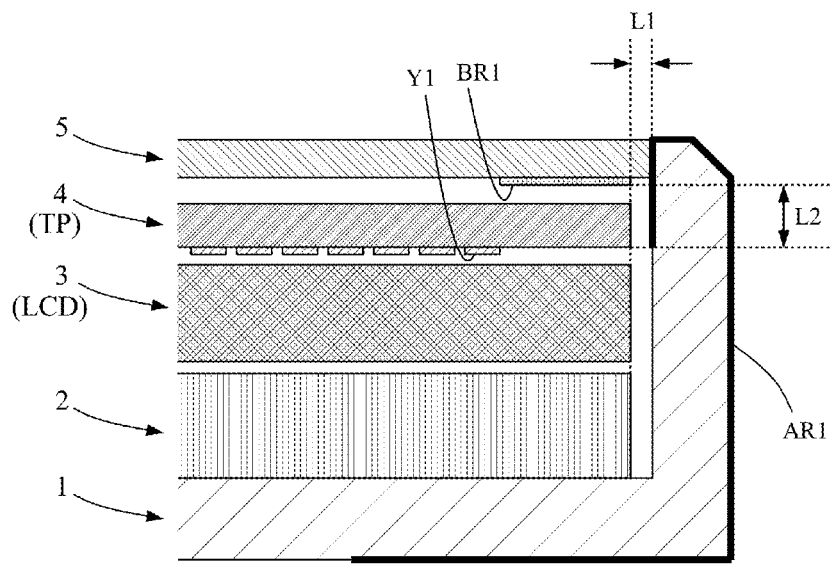

FIG. 9 illustrates an exemplary configuration of a touch-panel-equipped display device 1000B of the present modification example.

The upper view in FIG. 9 illustrates an actual exemplary configuration (one example) of the touch-panel-equipped display device 1000B. More specifically, the upper view in FIG. 9 is a cross-sectional perspective view (partial) (a cross-sectional perspective view taken along a line corresponding to the line A-A in FIG. 2) of the touch-panel-equipped display device 1000B in which an area including the first side surface electrode AR1 and the second side surface electrode BR1 is enlarged for illustration.

Further, the lower view in FIG. 9 is a view (cross-sectional view) illustrating an area including the first side surface electrode AR1 and the second side surface electrode BR1 of the touch-panel-equipped display device 1000B illustrated in the upper view in FIG. 9, the area being enlarged for illustration.

As illustrated in FIG. 9, in the touch-panel-equipped display device of the present modification example 1000B, the first side surface electrodes AR are formed to cover the bottom of the case 1 as well. This also applies to the first side surface electrodes AL.

In the touch-panel-equipped display device 1000B of the present modification example, the first side surface electrodes AR, AL are arranged on the bottom of the case 1 as well, which enables to detect a touched position at a high accuracy even if a user touches a part of the bottom of the case 1 where the first side surface electrodes AR, AL are arranged.

Modification Example 3

The following description describes Modification Example 3 of Embodiment 1.

Detailed descriptions of parts identical to those in the above-described examples are omitted. The parts identical to those in the above-described examples are denoted by the same reference numerals.

Figure 10:
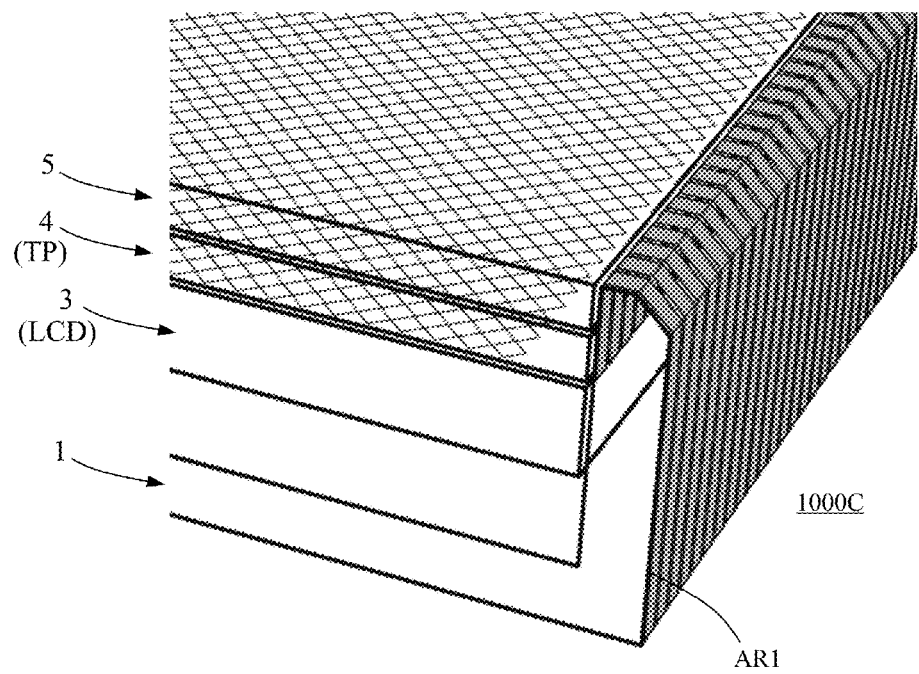
FIG. 10 illustrates an exemplary configuration of a touch-panel-equipped display device 1000C according to Modification Example 3 of Embodiment 1.
Figure 10:
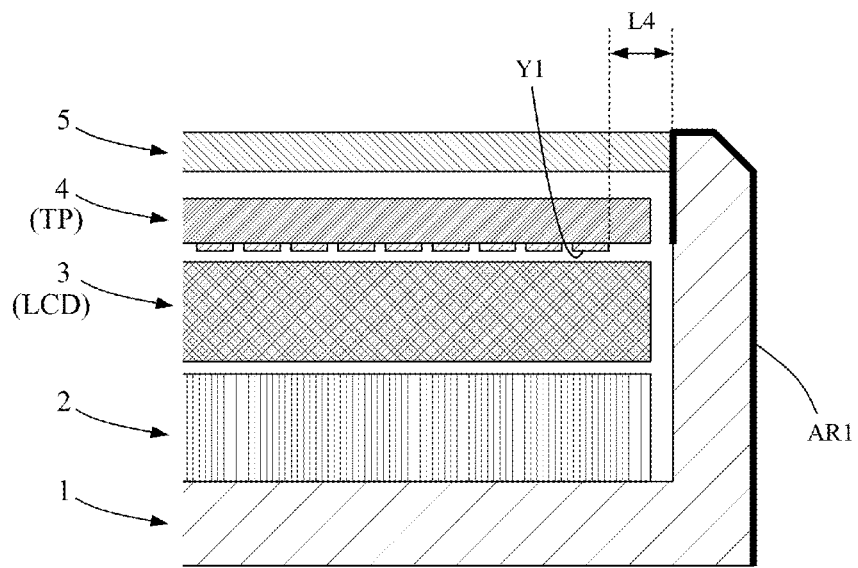

FIG. 10 illustrates an exemplary configuration of a touch-panel-equipped display device 1000C of the present modification example.

The touch-panel-equipped display device 1000C of the present modification example has the same configuration as that of the touch-panel-equipped display device 1000 of Embodiment 1 except that the second side surface electrodes BR, BL are omitted.

The upper view in FIG. 10 illustrates an actual exemplary configuration (one example) of the touch-panel-equipped display device 1000C. More specifically, the upper view in FIG. 10 is a cross-sectional perspective view (partial) of the touch-panel-equipped display device 1000C in which an area including the first side surface electrode AR1 is enlarged for illustration.

Further, the lower view in FIG. 10 is a view (cross-sectional view) illustrating an area including the first side surface electrode AR1 of the touch-panel-equipped display device 1000C illustrated in the upper view in FIG. 10, the area being enlarged for illustration.

As illustrated in FIG. 10, in the touch-panel-equipped display device 1000C of the present modification example, the second side surface electrode BR, BL are not provided. In the touch-panel-equipped display device 1000C of the present modification example, the first side surface electrodes AR and the Y-direction electrodes are arranged in such proximity that they can be capacitively coupled.

In the touch-panel-equipped display device 1000C, for example, in the lower view in FIG. 10, the Y-direction electrode Y1 and the first side surface electrode AR1 are arranged in such a manner that a distance L4 between the Y-direction electrode Y1 and a part of the first side surface electrode AR1 along the inner wall portion of the case 1 is such a distance that they can be capacitively coupled.

The distance L4 is, for example, 2 mm or less, and preferably, 1 mm or less.

In the case of the touch-panel-equipped display device 1000C of the present modification example, as is the case with the touch-panel-equipped display device 1000 of Embodiment 1, a touch on a side surface of the case can be detected at a high accuracy by a simple controlling operation (a controlling operation similar to that of a conventional touch panel), without hardware such as expensive sensors being provided additionally. The touch-panel-equipped display device 1000C of the present modification example, which does not need second side surface electrodes BR, BL, can be realized further inexpensively.

In the touch-panel-equipped display device 1000B of Modification Example 2 of Embodiment 1, as is the case with the present modification example, the second side surface electrodes BR, BL may be omitted.

Modification Example 4

The following description describes Modification Example 4 of Embodiment 1.

Detailed descriptions of parts identical to those in the above-described examples are omitted. The parts identical to those in the above-described examples are denoted by the same reference numerals.

Figure 11:
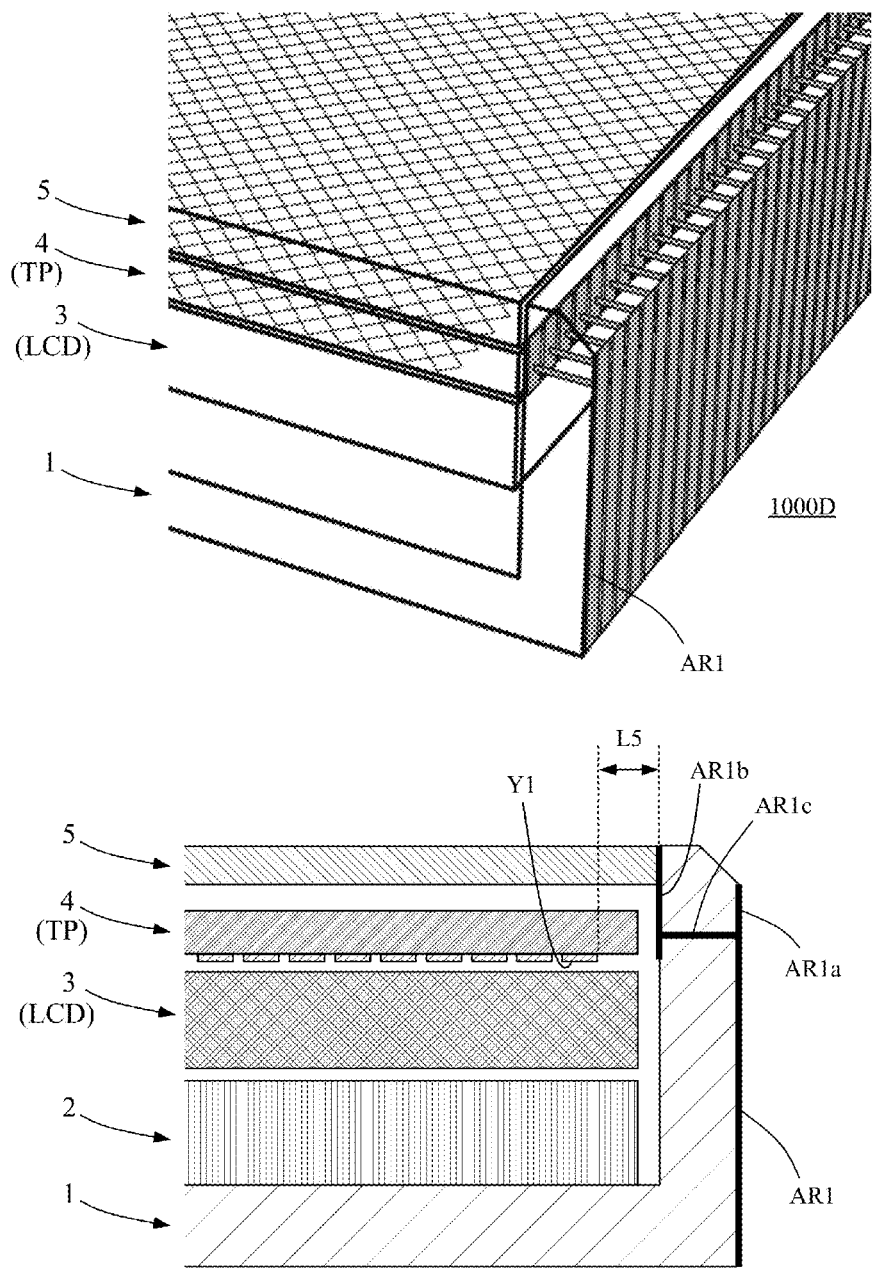
FIG. 11 illustrates an exemplary configuration of a touch-panel-equipped display device 1000D according to Modification Example 4 of Embodiment 1.

FIG. 11 illustrates an exemplary configuration of a touch-panel-equipped display device 1000D of the present modification example.

The touch-panel-equipped display device 1000D of the present modification example has the same configuration as that of the touch-panel-equipped display device 1000C of Modification Example 3 of Embodiment 1 except that the shapes of the first side surface electrodes AR, AL are changed.

The upper view in FIG. 11 illustrates an actual exemplary configuration (one example) of the touch-panel-equipped display device 1000D. More specifically, the upper view in FIG. 11 is a cross-sectional perspective view (partial) of the touch-panel-equipped display device 1000D in which an area including the first side surface electrode AR1 is enlarged for illustration.

Further, the lower view in FIG. 11 is a view (cross-sectional view) illustrating an area including the first side surface electrode AR1 of the touch-panel-equipped display device 1000D illustrated in the upper view in FIG. 11, the area being enlarged for illustration.

As illustrated in FIG. 11, the first side surface electrode AR1 of the touch-panel-equipped display device 1000D of the present modification example, when viewed in a cross section, is composed of a first side wall portion AR1a formed so as to cover an outer side of the side wall portion of the case 1, a second side wall portion AR1b formed so as to cover an inner side of the side wall portion of the case 1, and a connecting portion AR1c that connects the first side wall portion AR1a and the second side wall portion AR1b with each other.

As illustrated in FIG. 11, in the touch-panel-equipped display device 1000D of the present modification example, a hole is formed in the case 1 so that the connecting portion AR1c of the first side surface electrode AR1 connects the first side wall portion AR1a and the second side wall portion AR1b with each other through the hole of the case 1.

In the touch-panel-equipped display device 1000D of the present modification example, the first side surface electrodes AR (the second side wall portion AR1b in the case of the first side surface electrode AR1) and the Y-direction electrodes are arranged in such proximity that they can be capacitively coupled.

In the touch-panel-equipped display device 1000D, for example, in the lower view in FIG. 11, the Y-direction electrode Y1 and the first side surface electrode AR1 are arranged in such a manner that the distance L5 between the Y-direction electrode Y1 and a portion of the first side surface electrode AR1 along the inner wall portion of the case 1 is such a distance that they can be capacitively coupled with each other.

The distance L5 is, for example, 2 mm or less, and preferably, 1 mm or less.

In the case of the touch-panel-equipped display device 1000D of the present modification example, as is the case with the touch-panel-equipped display device 1000 of Embodiment 1, a touch on a side surface of the case can be detected at a high accuracy by a simple controlling operation (a controlling operation similar to that of a conventional touch panel), without hardware such as expensive sensors being provided additionally.

Besides, in the touch-panel-equipped display device 1000D of the present modification example, unlike the above-described examples, the first side surface electrodes AR do not have to be provided along an edge part of the case 1, which thereby hardly causes disconnection, and makes it possible to improve the reliability.

Modification Example 5

The following description describes Modification Example 5 of Embodiment 1.

Detailed descriptions of parts identical to those in the above-described examples are omitted. The parts identical to those in the above-described examples are denoted by the same reference numerals.

Figure 12:
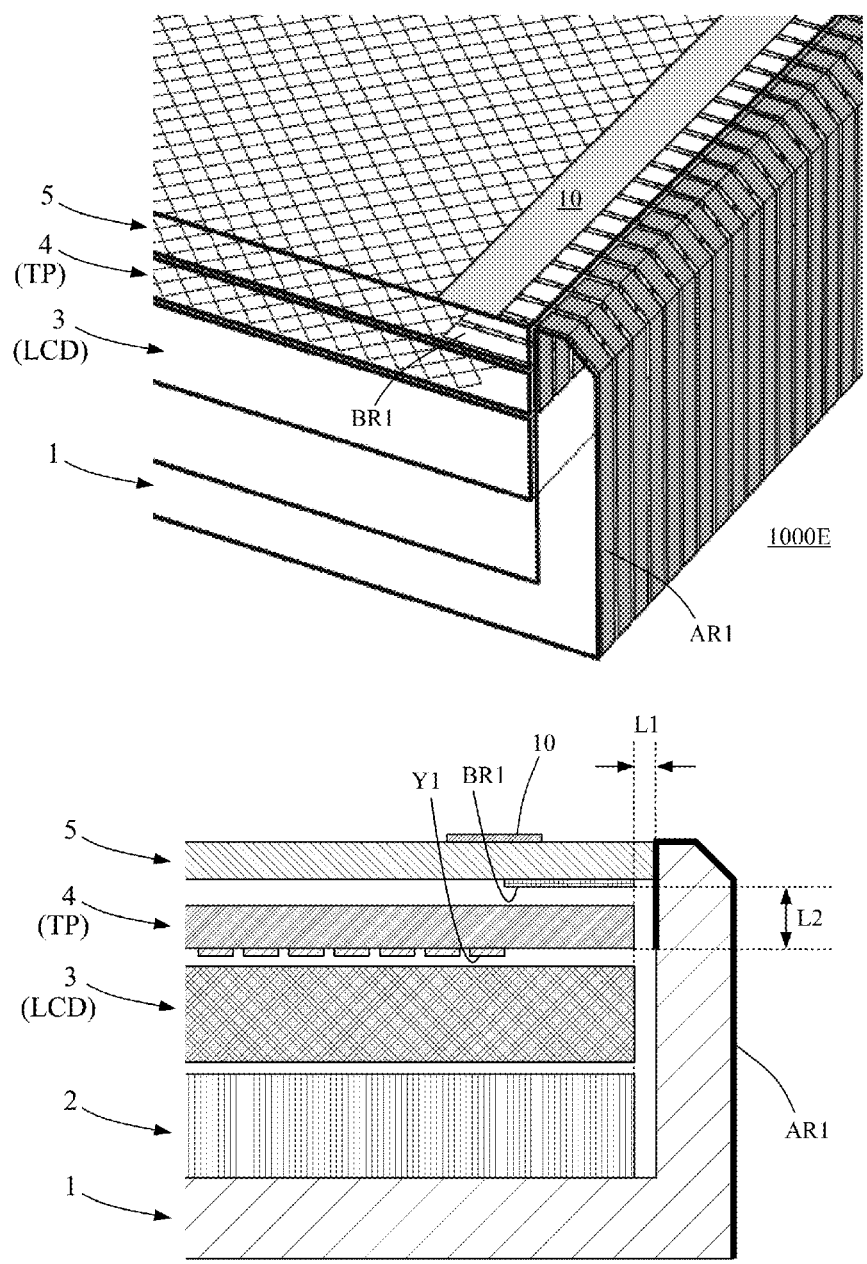
FIG. 12 illustrates an exemplary configuration of a touch-panel-equipped display device 1000E according to Modification Example 5 of Embodiment 1.

FIG. 12 illustrates an exemplary configuration of a touch-panel-equipped display device 1000E of the present modification example.

The touch-panel-equipped display device 1000E of the present modification example has the same configuration as that of the touch-panel-equipped display device 1000 of Embodiment 1 except that a conductive layer 10 is added.

The upper view in FIG. 12 illustrates an actual exemplary configuration (one example) of the touch-panel-equipped display device 1000E. More specifically, the upper view in FIG. 12 is a cross-sectional perspective view (partial) of the touch-panel-equipped display device 1000E in which an area including the first side surface electrode AR1 is enlarged for illustration.

Further, the lower view in FIG. 12 is a view (cross-sectional view) illustrating an area including the first side surface electrode AR1 of the touch-panel-equipped display device 1000E illustrated in the upper view in FIG. 12, the area being enlarged for illustration.

The conductive layer 10 is formed with a conductive material. The conductive layer 10 is a flat-plate-type conductive member that extends in a direction in which the first side surface electrodes AR are arrayed (the Y-axis direction), as illustrated in FIG. 12. The conductive layer 10 is formed on the cover 5, as illustrated in FIG. 12, and is arranged at such a position as the conductive layer 10, when viewed in a plan view, covers the sense electrode portions of the Y-direction electrodes arranged at the shortest distance from the first side surface electrodes AR. When a user touches the conductive layer 10 with a finger, therefore, a uniform capacitance change occurs to the Y-direction electrodes in the same line that overlap the conductive layer 10 when viewed in a plan view.

In other words, here, the touch panel controller 6 detects that the sense signals received from all of the sense lines are uniform signals (signals having amplitudes equal to or greater than a predetermined amplitude, respectively), which means that it is possible to detect a state in which the user touches the conductive layer 10 with a finger.

Using this, the configuration of the touch-panel-equipped display device 1000E of the present modification example may be as follows, for example: (1) while a user is touching the conductive layer 10, a predetermined processing is not executed, even if a touch on the first side surface electrodes AR, AL is detected; and (2) only while a user is not touching the conductive layer 10, a touch on the first side surface electrodes AR, AL is detected, and a predetermined processing is executed according to the detected touched position.

With this configuration, in the touch-panel-equipped display device 1000E of the present modification example, when a user unintentionally touches a side surface of the case 1 (a portion where the first side surface electrodes AR, AL are arranged), an unintended processing can be appropriately prevented from being executed.

Modification Example 6

The following description describes Modification Example 6 of Embodiment 1.

Detailed descriptions of parts identical to those in the above-described examples are omitted. The parts identical to those in the above-described examples are denoted by the same reference numerals.

Figure 13:
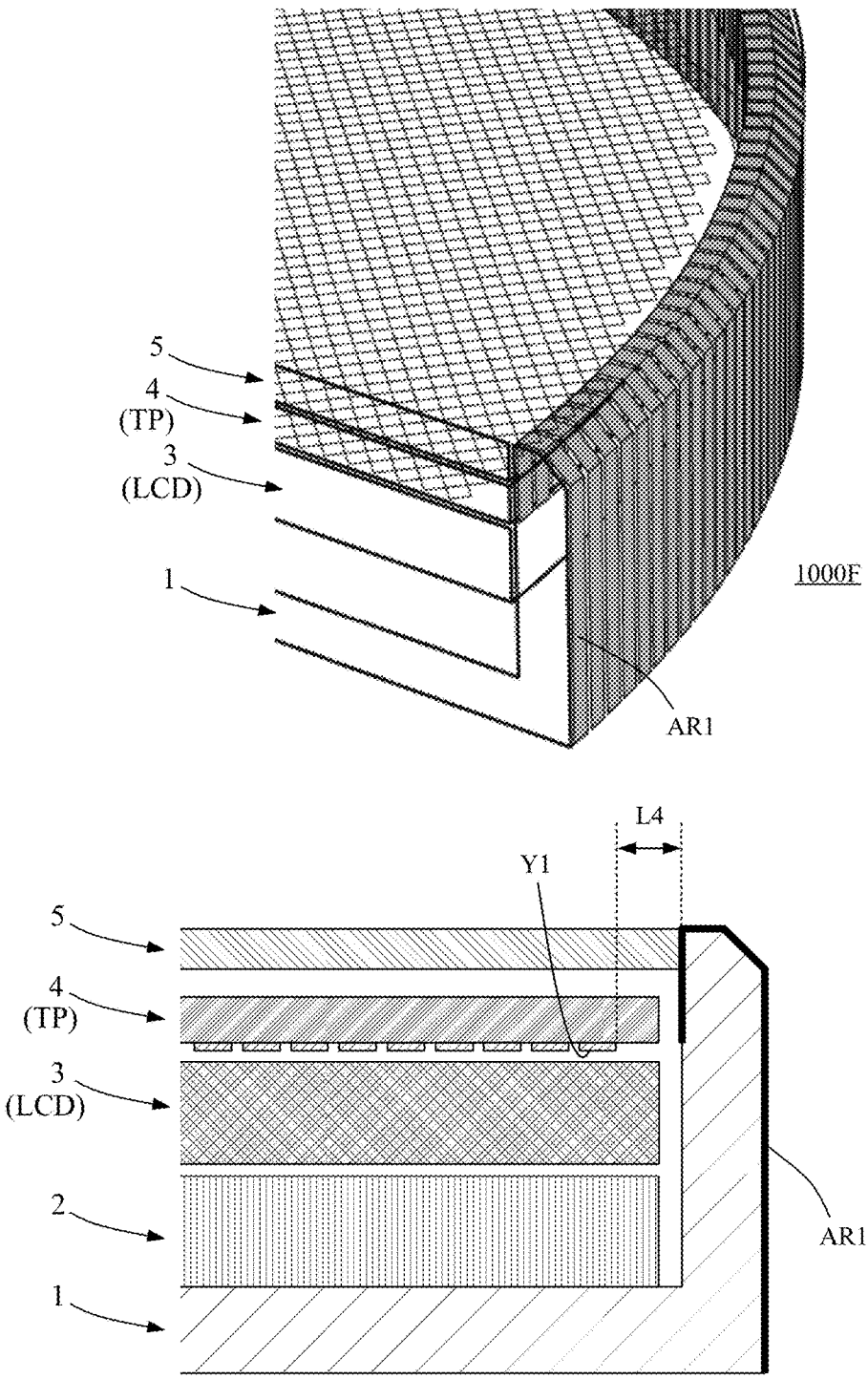
FIG. 13 illustrates an exemplary configuration of a touch-panel-equipped display device 1000F according to Modification Example 6 of Embodiment 1.

FIG. 13 illustrates an exemplary configuration of a touch-panel-equipped display device 1000F of the present modification example.

In the touch-panel-equipped display device 1000F of the present modification example, a part of the case 1 has a curved shape when viewed in a plan view.

The upper view in FIG. 13 illustrates an actual exemplary configuration (one example) of the touch-panel-equipped display device 1000F. More specifically, the upper view in FIG. 13 is a cross-sectional perspective view (partial) of the touch-panel-equipped display device 1000F in which an area including the first side surface electrode AR1 is enlarged for illustration.

Further, the lower view in FIG. 13 is a view (cross-sectional view) illustrating an area including the first side surface electrode AR1 of the touch-panel-equipped display device 1000F illustrated in the upper view in FIG. 13, the area being enlarged for illustration.

As illustrated in FIG. 13, in the touch-panel-equipped display device 1000F of the present modification example, even if the case 1 has a curved portion, the first side surface electrodes can be arranged along the curved portion.

Therefore, for example, even on a portion on which it is difficult to curve and arrange a single touch panel, the first side surface electrodes can be arranged appropriately.

With this configuration, the touch-panel-equipped display device 1000F of the present modification example can be applied to the case 1 that has a complicated shape.

Embodiment 2

The following description describes Embodiment 2.

Detailed descriptions of parts identical to those in the above-described embodiment are omitted. The parts identical to those in the above-described embodiment are denoted by the same reference numerals.

Figure 14:
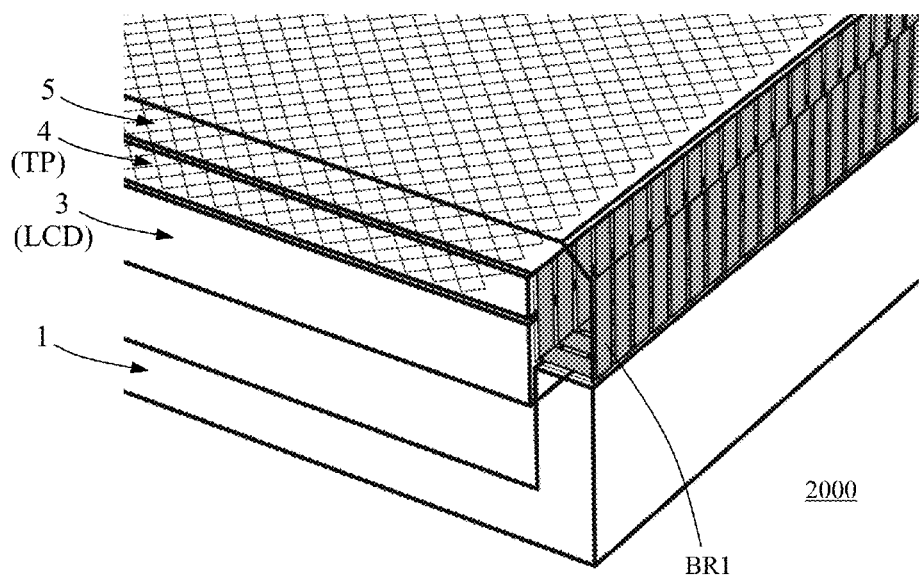
FIG. 14 illustrates an exemplary configuration of a touch-panel-equipped display device 2000 according to Embodiment 2.
Figure 14:
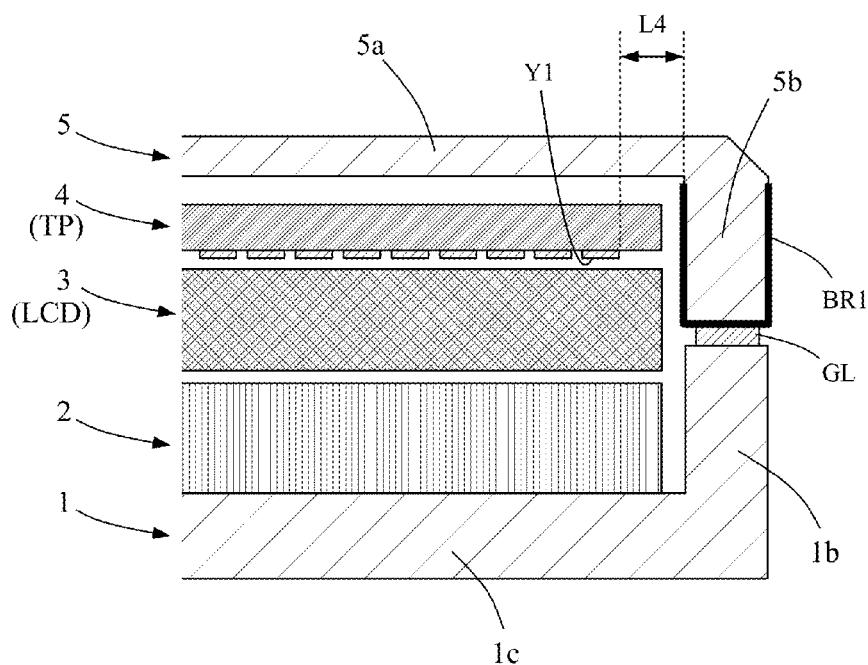

FIG. 14 illustrates an exemplary configuration of a touch-panel-equipped display device 2000 of Embodiment 2.

The touch-panel-equipped display device 2000 of the present embodiment is different from the touch-panel-equipped display device 1000 of Embodiment 1 regarding the shape of the case 1, the shape of the cover 5, and the shapes of the second side surface electrodes BR, BL. Further, the touch-panel-equipped display device 2000 of the present embodiment has such a configuration that the first side surface electrodes AR, AL are omitted from the configuration of the touch-panel-equipped display device 1000 of Embodiment 1.

The upper view in FIG. 14 illustrates an actual exemplary configuration (one example) of the touch-panel-equipped display device 2000. More specifically, the upper view in FIG. 14 is a cross-sectional perspective view (partial) of the touch-panel-equipped display device 2000 in which an area including the second side surface electrode BR1 is enlarged for illustration.

Further, the lower view in FIG. 14 is a view (cross-sectional view) illustrating an area including the second side surface electrode BR1 of the touch-panel-equipped display device 2000 illustrated in the upper view in FIG. 14, the area being enlarged for illustration.

As illustrated in FIG. 14, the cover 5 in the present embodiment includes a flat plate portion 5a, and a first side wall portion 5b that extends from one of ends of the flat plate portion 5a toward the case 1 side.

As illustrated in FIG. 14, the case 1 in the present embodiment includes a bottom 1c, and a side wall portion 1b that extends from one of ends of the bottom 1c toward the cover 5 side.

As illustrated in FIG. 14, the second side surface electrode BR1 in the present embodiment is formed so as to cover an inner side of the side wall portion of the cover 5, a surface of the side wall portion of the cover 5 that is opposed to the case 1, and an outer side of the side wall portion of the cover 5. This also applies to the second side surface electrodes BR, BL, in addition to the second side surface electrode BR1.

FIG. 14 illustrates only a vicinity of a side surface on one side of the touch-panel-equipped display device 2000. On the other side surface as well, each member is formed, in a shape horizontally symmetric to that in a cross-sectional view of the lower view in FIG. 14.

Further, as illustrated in FIG. 14, the case 1 and the cover 5 are bonded with an adhesive GL.

In the touch-panel-equipped display device 2000 of the present embodiment, as illustrated in FIG. 14, the distance between the second side surface electrode BR1 and the Y-direction electrode Y1 is set to be such a distance that they are capacitively coupled.

Therefore, in a case where a user touches the second side surface electrode BR1 with a finger, a capacitance change caused by the touch of the user's finger can be detected by the Y-direction electrode Y1, since the second side surface electrode BR1 and the Y-direction electrode Y1 are capacitively coupled.

This also applies to the second side surface electrodes BR, BL in addition to the second side surface electrode BR1.

In other words, with the above-described configuration of the touch-panel-equipped display device of the present embodiment, as is the case with Embodiment 1, a touch on the second side surface electrodes BR, BL can be detected at a high accuracy.

Further, since the touch-panel-equipped display device 2000 of the present embodiment does not need the first side surface electrodes AR, AL, the touch-panel-equipped display device 2000 can be realized more inexpensively.

Figure 15:
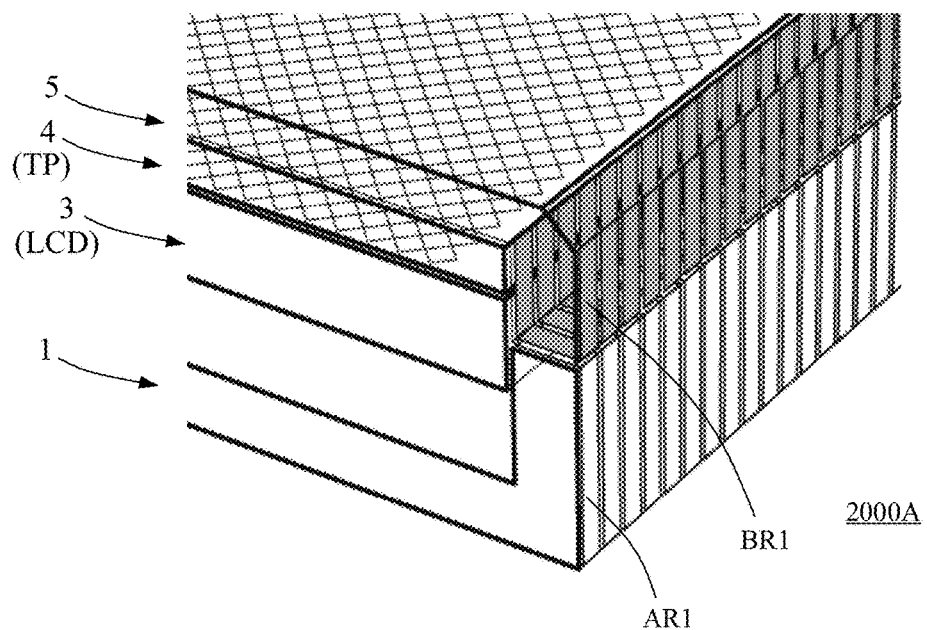
FIG. 15 illustrates an exemplary configuration of the touch-panel-equipped display device 2000 in a case where first side surface electrodes AR, AL are added (touch-panel-equipped display device 2000A).
Figure 15:
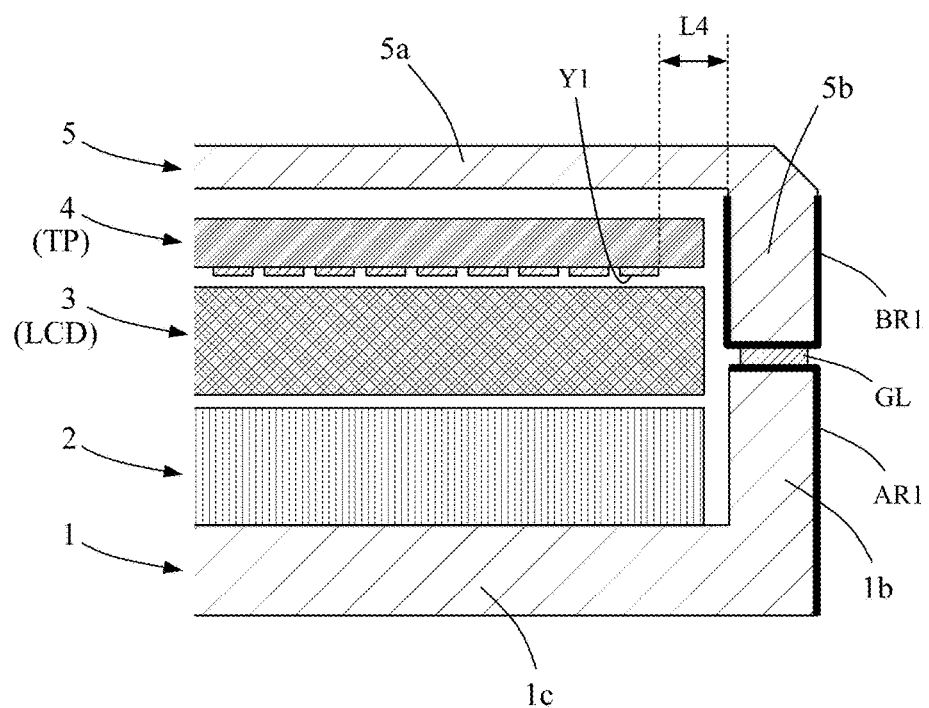

As illustrated in FIG. 15, the touch-panel-equipped display device 2000 may have such a configuration that the first side surface electrodes AR, AL are provided additionally (a touch-panel-equipped display device 2000A).

Figure 16:
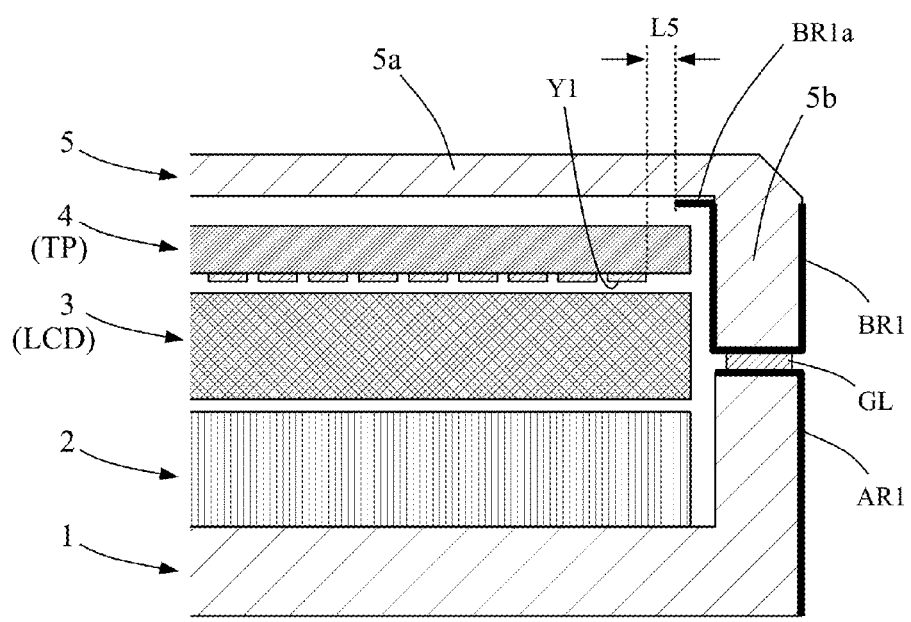
FIG. 16 is a cross-sectional view illustrating a modification example of the touch-panel-equipped display device 2000.

Further, as illustrated in FIG. 16, the second side surface electrode BR1 in the present embodiment may be in a shape that has an extension portion BR1a that extends from an end of the portion thereof covering an inner side of the side wall portion of the cover 5 toward the inner side. This makes it possible to more easily decrease the distance L5 between the second side surface electrode BR1 and the Y-direction electrode Y1.

Modification Example 1

The following description describes Modification Example 1 of Embodiment 2.

Detailed descriptions of parts identical to those in the above-described embodiment are omitted. The parts identical to those in the above-described embodiment are denoted by the same reference numerals.

Figure 17:
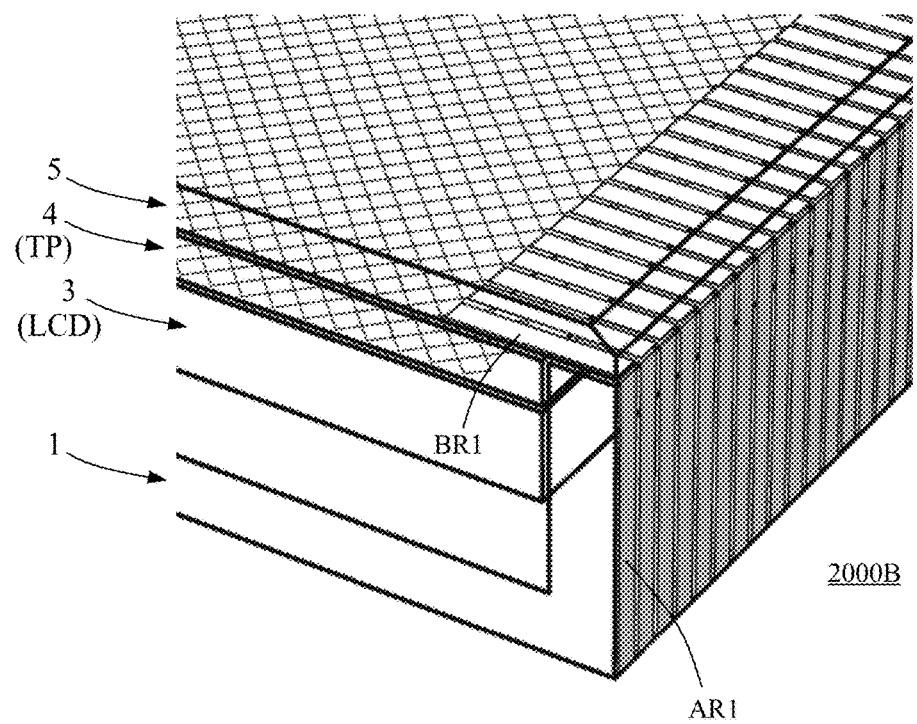
FIG. 17 is an exemplary configuration of a touch-panel-equipped display device 2000B according to Modification Example 1 of Embodiment 2.
Figure 17:
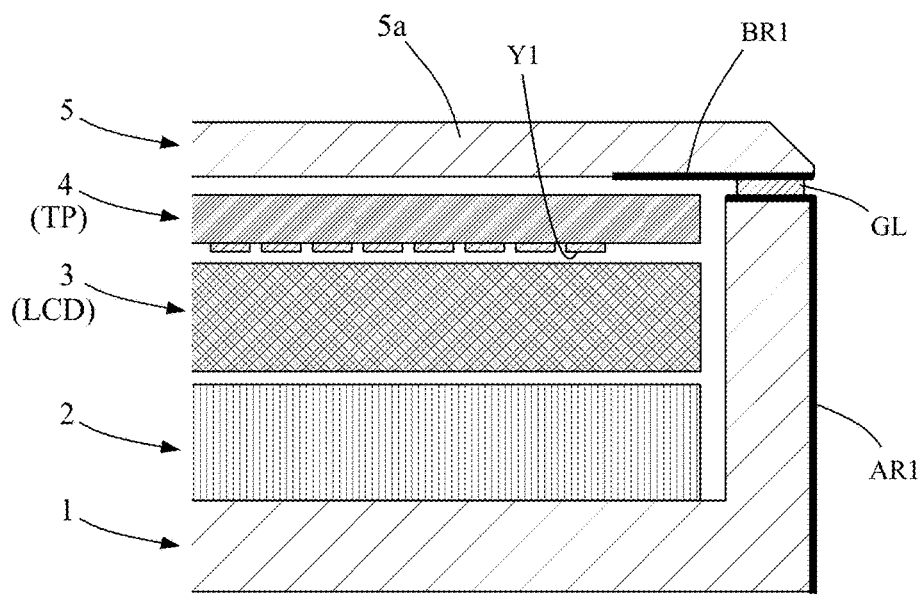

FIG. 17 illustrates an exemplary configuration of a touch-panel-equipped display device 2000B of the present modification example.

The touch-panel-equipped display device 2000B of the present embodiment is different from the touch-panel-equipped display device 1000 of Embodiment 1 regarding the shape of the case 1, the shape of the cover 5, the shapes of the first side surface electrode AR, AL, and the shapes of the second side surface electrodes BR, BL.

The upper view in FIG. 17 illustrates an actual exemplary configuration (one example) of the touch-panel-equipped display device 2000B. More specifically, the upper view in FIG. 17 is a cross-sectional perspective view (partial) of the touch-panel-equipped display device 2000B in which an area including the first side surface electrode AR1 and the second side surface electrode BR1 is enlarged for illustration.

Further, the lower view in FIG. 17 is a view (cross-sectional view) illustrating an area including the first side surface electrode AR1 and the second side surface electrode BR1 of the touch-panel-equipped display device 2000B illustrated in the upper view in FIG. 17, the area being enlarged for illustration.

As illustrated in FIG. 17, the cover 5 in the present embodiment includes a flat plate portion 5a, and a first side wall portion 5b that extends from one of ends of the flat plate portion 5a toward the case 1 side.

As illustrated in FIG. 17, the case 1 in the present embodiment has a flat plate shape.

As illustrated in FIG. 17, the second side surface electrode BR1 in the present embodiment is of a flat plate type, and is formed on a touch panel TP side surface of the cover 5. This also applies to the second side surface electrodes BR, BL in addition to the second side surface electrode BR1.

FIG. 17 illustrates only a vicinity of a side surface on one side of the touch-panel-equipped display device 2000B is illustrated. On the other side surface as well, each member is formed, in a horizontally symmetric shape in a cross-sectional view of the lower view in FIG. 17.

Further, as illustrated in FIG. 17, the case 1 and the cover 5 are bonded with an adhesive GL.

In the case of the touch-panel-equipped display device of the present modification example 2000B, as is the case with Embodiment 1, with the above-described configuration, a touch on the first side surface electrodes AR, AL can be detected at a high accuracy.

Embodiment 3

The following description describes Embodiment 3.

Detailed descriptions of parts identical to those in the above-described embodiments are omitted. The parts identical to those in the above-described embodiment are denoted by the same reference numerals.

Figure 18:
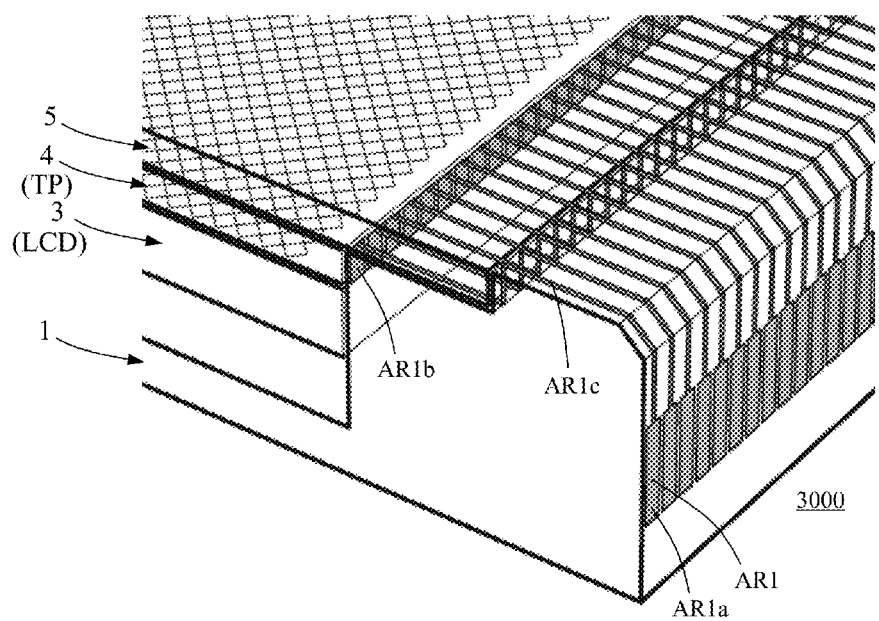
FIG. 18 is an exemplary configuration of a touch-panel-equipped display device 3000 according to Embodiment 3.
Figure 18:
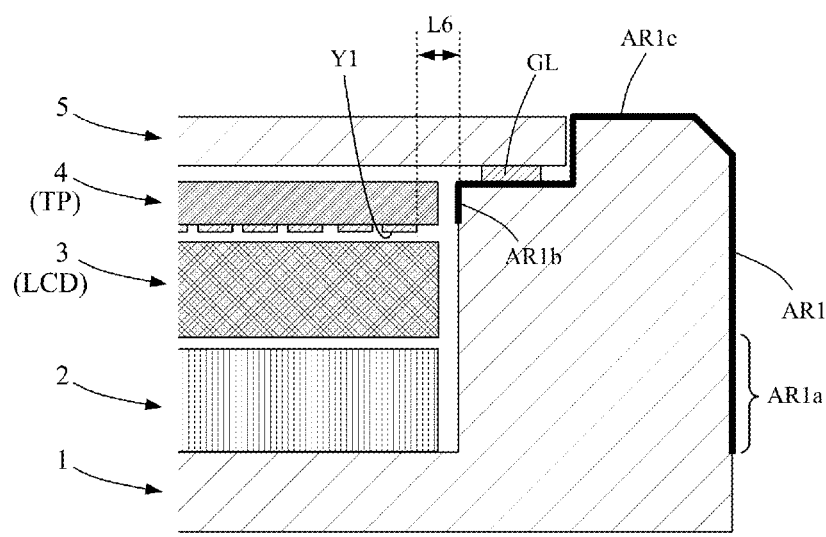

FIG. 18 illustrates an exemplary configuration of a touch-panel-equipped display device 3000 of Embodiment 3.

The touch-panel-equipped display device 3000 of the present embodiment has a configuration identical to the touch-panel-equipped display device 1000C of Modification Example 3 of Embodiment 1 except that the shapes of the first side surface electrodes AR, AL are changed, and further, the shape of the case 1 is changed.

The upper view in FIG. 18 illustrates an actual exemplary configuration (one example) of the touch-panel-equipped display device 3000. More specifically, the upper view in FIG. 18 is a cross-sectional perspective view (partial) of the touch-panel-equipped display device 3000 in which an area including the first side surface electrode AR1 is enlarged for illustration.

Further, the lower view in FIG. 18 is a view (cross-sectional view) illustrating an area including the first side surface electrode AR1 of the touch-panel-equipped display device 3000 illustrated in the upper view in FIG. 18, the area being enlarged for illustration.

As illustrated in FIG. 18, the first side surface electrode AR1 of the touch-panel-equipped display device 3000 of the present embodiment is composed of a first side wall portion AR1*a* formed so as to cover an outer side of the side wall portion of the case 1, a second side wall portion AR1*b* formed so as to cover an inner side of side wall portion of the case 1, and a connecting portion AR1*c* that connects the first side wall portion AR1*a* and the second side wall portion AR1*b* with each other.

Further, as illustrated in FIG. 18, the first side wall portion AR1*a* is formed so that the width of the first side wall portion AR1*a* is greater than the width of the connecting portion AR1*c*. The first side wall portion AR1*a* preferably has such a width that a capacitance change can be detected. For example, the width of the first side wall portion AR1*a* is preferably 1 mm or more. Further, the width of the first side wall portion AR1*a* is preferably 20 mm or less.

Still further, as illustrated in FIG. 18, the second side wall portion AR1*b* is formed so that the width of the second side wall portion AR1*b* is greater than the width of the connecting portion AR1*c*.

The connecting portion AR1*c* preferably has such a width that a capacitance change cannot be detected. For example, the connecting portion AR1*c* preferably has a width of less than 1 mm.

Besides, in the touch-panel-equipped display device 3000, the first side surface electrodes AR (the second side wall portion AR1*b* in the case of the first side surface electrode AR1) and the Y-direction electrodes are arranged in such a proximity that they can be capacitively coupled with each other.

In the touch-panel-equipped display device 3000, for example, in the lower view in FIG. 18, the Y-direction electrode Y1 and the first side surface electrode AR1 are arranged in such a manner that a distance L6 between the Y-direction electrode Y1 and a part of the first side surface electrode AR1 along the inner wall portion of the case 1 (the second side wall portion AR1*b*) is such a distance that they can be capacitively coupled.

The distance L6 is, for example, 2 mm or less, and preferably, 1 mm or less.

By forming the first side surface electrode AR1 in this way, the sensitivity for a capacitance change when a user touches the part of the first side wall portion AR1*a* with a finger can be made higher than the sensitivity for a capacitance change when a user touches the part of the connecting portion AR1*c* with a finger.

In other words, by forming the first side surface electrode AR1 in this way, such control is enabled that only when a user touches the part of the first side wall portion AR1*a* having a higher sensitivity for a capacitance change, the touch is detected in touch-panel-equipped display device 3000.

In the touch-panel-equipped display device 3000, with such control, even in a case where a user unintendedly touches the part of the connecting portion AR1*c*, an unintended processing can be appropriately prevented from being executed. This also applies to the first side surface electrodes AR, BR, in addition to the first side surface electrode AR1.

As described above, in the case of the touch-panel-equipped display device 3000 of the present embodiment, as is the case with the touch-panel-equipped display devices of the above-described embodiments, a touch on a side surface of the case can be detected at a high accuracy by a simple controlling operation (the same controlling operation as that of the conventional touch panel), without hardware such as expensive sensors being additionally provided.

Further, in the case of the touch-panel-equipped display device of the present embodiment, a part having a high touch detection sensitivity (a touch-detectable area), and a part having a low touch detection sensitivity (a touch-undetectable area) can be provided by varying the width of the electrodes. In the touch-panel-equipped display device of the present embodiment, therefore, for example, it is easy to provide a part having a high touch detection sensitivity (a touch-detectable area) at a predetermined position, so that when the touch-detectable area is touched, a predetermined processing is executed.

Figure 19:
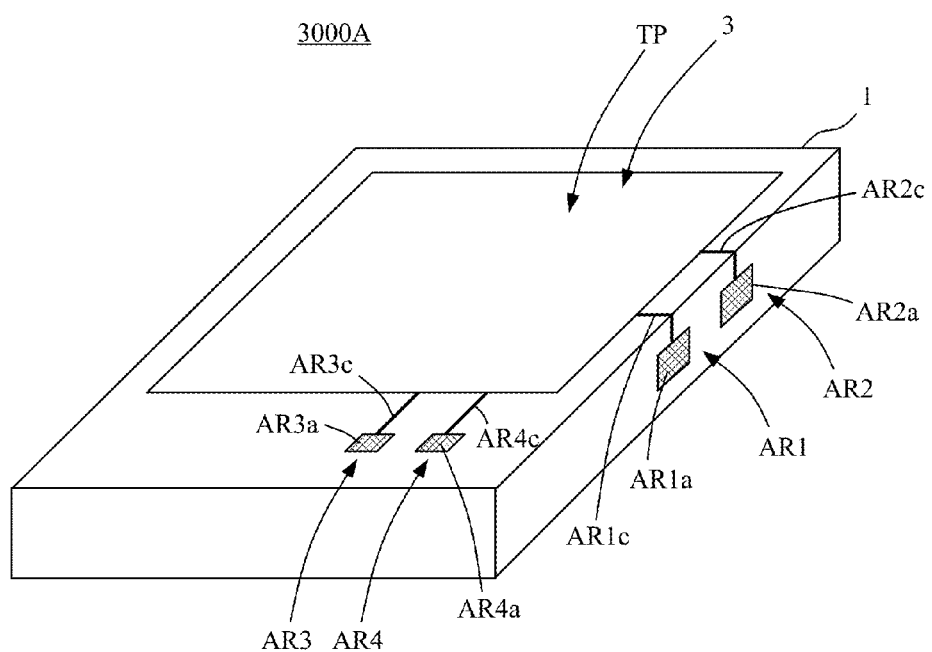
FIG. 19 illustrates a schematic configuration of a touch-panel-equipped display device 3000A

For example, as illustrated in FIG. 19, first side surface electrodes AR1, AR2, AR3, and AR4 may be provided at predetermined positions on the case 1.

In the case of the touch-panel-equipped display device 3000A illustrated in FIG. 19, for example, the following controlling operation may be performed so as to control the touch-panel-equipped display device 3000A: when the touch-detectable area AR1a of the first side surface electrode AR1 is touched, the volume of sound output from the touch-panel-equipped display device 3000A decreases, and when the touch-detectable area AR2a of the first side surface electrode AR2 is touched, the volume of sound output from the touch-panel-equipped display device 3000A increases.

Further, in the case of the touch-panel-equipped display device 3000A illustrated in FIG. 19, for example, the following controlling operation may be performed so as to control the touch-panel-equipped display device 3000A: when the touch-detectable area AR3a of the first side wall portion AR3 is touched, the luminance of the display panel of the touch-panel-equipped display device 3000A decreases, and when the touch-detectable area AR4a of the first side wall portion AR4 is touched, the luminance of the display panel of the touch-panel-equipped display device 3000A increases.

In this way, in the case of the touch-panel-equipped display device 3000A, a specific button or the like is not arranged, and only the touch-detectable areas of the first side surface electrodes AR, BR are provided at predetermined positions, which makes it possible to cause predetermined actions to be executed when the touch-detectable areas are touched.

Figure 20:
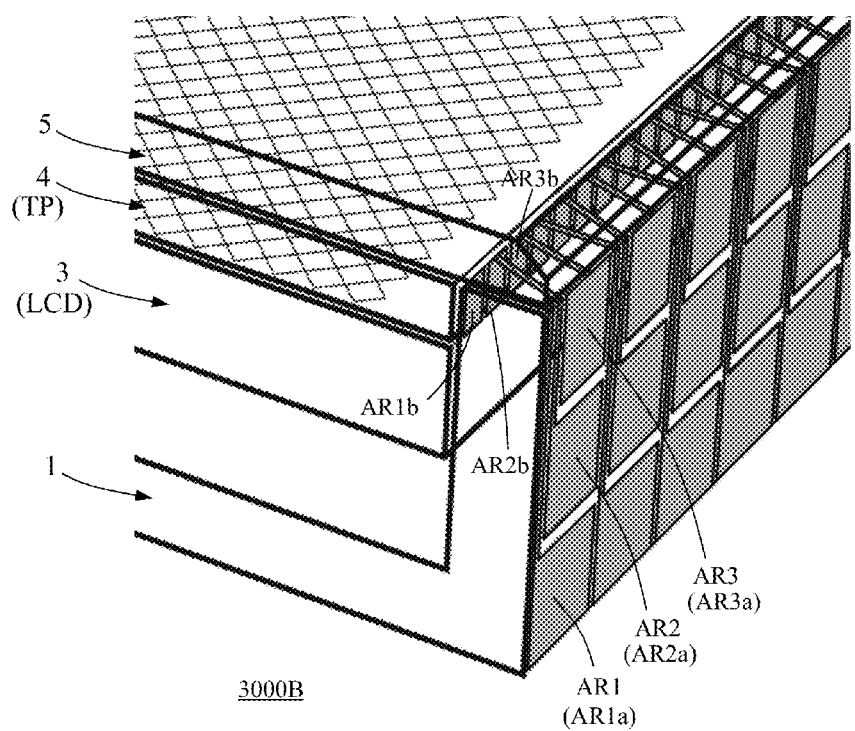
FIG. 20 illustrates an exemplary configuration of a touch-panel-equipped display device 3000B.

Further, as illustrated in FIG. 20, touch-detectable areas may be arrayed in the side surface width direction so that a motion or the like in the side surface width direction can be detected.

For example, in a case of a touch-panel-equipped display device 3000B, a cross section perspective view of which is illustrated in FIG. 20, touch-detectable areas are arranged in such a manner that three of the same are arrayed in the width direction of the on side surface of the case 1 (in the vertical direction in FIG. 20).

More specifically, in the first column (the front-most column in FIG. 20),
(1) the first side wall portion AR1a (the touch-detectable area) of the first side surface electrode AR1,
(2) the first side wall portion AR2a (the touch-detectable area) of the first side surface electrode AR2, and,
(3) the first side wall portion AR3a (the touch-detectable area) of the first side surface electrode AR3,
are arranged in the width direction of the side surface of the case 1 (in the vertical direction in FIG. 20).

The second column and the columns behind the same are configured in the same pattern as described above, whereby in the touch-panel-equipped display device 3000B, the touch-detectable areas are arranged in such a manner that three of the same are arrayed in the width direction of the side surface of the case 1 (in the vertical direction in FIG. 20).

This configuration makes it possible to detect a position in the width direction of the side surface of the case 1 (in the vertical direction in FIG. 20) of the touched position. With this configuration, for example, by using the first side surface electrodes AR, BR in the touch-panel-equipped display device 3000B, a predetermined action (for example, a slide switch function, a volume control function, a function of controlling luminance of the display panel, and the like) can be executed more easily when a finger is shifted in the vertical direction.

Figure 21:
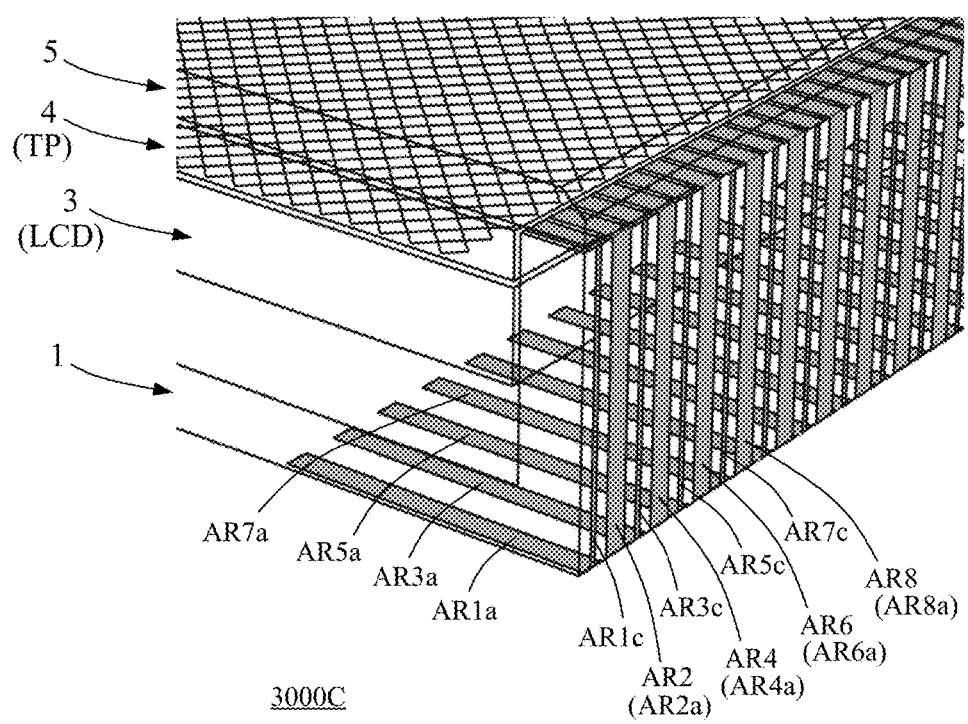
FIG. 21 illustrates an exemplary configuration of a touch-panel-equipped display device 3000C.

Further, as illustrated in FIG. 21, a touch-panel-equipped display device 3000C may be realized so as to include: (1) the first side surface electrodes AR1c, AR3c, AR5c, . . . that have touch-undetectable areas (for example, the connecting portions AR1c, AR3c, AR5c, . . . in FIG. 21) on the side surface of the case 1, and touch-detectable areas (for example, the first side surface electrodes AR1, AR3, AR5, . . . in FIG. 21) on the bottom surface of the case 1; and (2) the first side surface electrodes AR2, 4, AR4, AR6, . . . that have touch-detectable areas (for example, connecting portions AR2, AR4, AR6, . . . in FIG. 21) on the side surface of the case 1. In the touch-panel-equipped display device 3000C, the first side surface electrodes AL are also configured in a manner similar to that described above.

As illustrated in FIG. 21, in the touch-panel-equipped display device 3000C, the first side surface electrodes AR1, AR3, AR5, . . . that have the touch-detectable areas on the side surface of the case 1, and the first side surface electrodes AR2, AR4, AR6, . . . that have the touch-detectable areas on the bottom surface of the case 1, are alternately arranged. Therefore, in the case of the touch-panel-equipped display device 3000C, it can be appropriately determined whether a touched position is on the bottom surface of the case 1, or on the side surface of the case 1.

Other Embodiments

The above-described embodiments (including the modification examples) are described with reference to, as exemplary cases, the cases where the first side surface electrodes AR, AL and/or the second side surface electrodes BR, BL are formed only on opposed side surfaces (the left and right side surfaces) of the case 1 of the touch-panel-equipped display device, but the configuration is not limited to this. For example, the configuration of the touch-panel-equipped display device may be such that the first side surface electrodes AR, AL and/or the second side surface electrodes BR, BL are formed only on the other opposed side surfaces (on the upper and lower side surfaces) of the case 1 of the touch-panel-equipped display device, or on all of the four side surfaces thereof.

Further, the above-described embodiments (including the modification examples) are applicable, not only to mobile terminals, tablet terminals, etc., but also to large-size electronic equipment such as a large-screen TV. In other words, the present invention is applicable to any arbitrary electronic equipment as long as it is electronic equipment configured so that the first side surface electrodes AR, AL and/or the second side surface electrodes BR, BL described above can be formed on the case.

Further, in a touch-panel-equipped display device of the above-described embodiments (including the modification examples), in a case where the first side surface electrodes AR, AL and/or the second side surface electrodes BR, BL are provided in a state of being exposed to the outside, the first side surface electrodes AR, AL and/or the second side surface electrodes BR, BL may be covered with a protection cover or the like.

Further, in the above-described embodiments (including the modification examples), the numbers, positions, pitches, and the like of the X-direction electrodes, the Y-direction electrodes, the first side surface electrodes AR, AL, the second side surface electrode BR, BL, and the like arranged therein are merely examples, and these are not limited to those described in the foregoing descriptions of the embodiments (including the modification examples).

In a case where the touch-panel-equipped display devices of the above-described embodiments (including the modification examples) are realized as portable terminal devices, the configuration may be such that the state of the user's hand holding the device is determined and a predetermined processing is executed based on the determine result.

Figure 22:
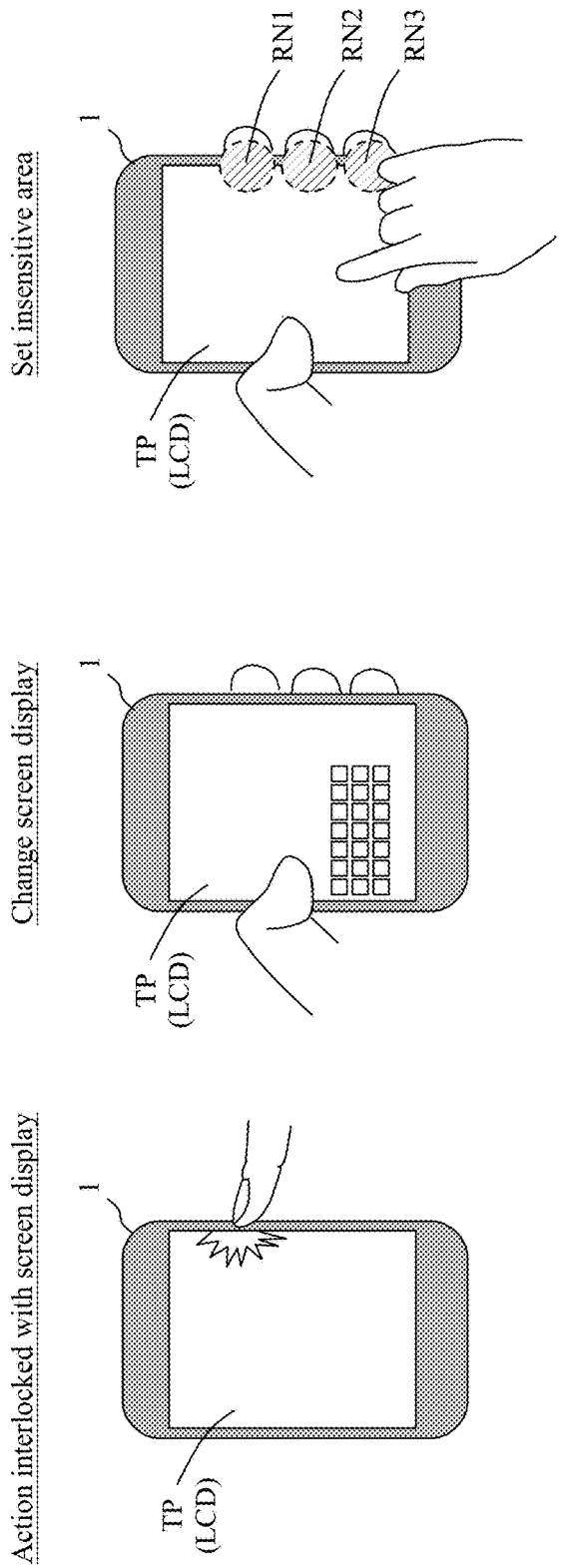
FIG. 22 is a view for describing exemplary applications using the touch-panel-equipped display device.

For example, as illustrated in FIG. 22, the configuration of the touch-panel-equipped display device may be such that, based on a touched position detected on a side surface of the case, for example, (1) a processing of performing an action interlocked with the screen display (the left view in FIG. 22), (2) a processing of changing the screen display (the center view in FIG. 22), (3) a processing of setting an insensitive area (the right view in FIG. 22), and the like are executed.

In the processing (1) of performing an action interlocked with the screen display (the left view in FIG. 22), in a case where a side surface of the touch-panel-equipped display device is touched, for example, a processing such as the sound volume adjustment or the screen luminance adjustment may be executed, or an operation such as the file selection may be executed, according to the touched position.

Further, in the processing (2) of changing the screen display (the center view in FIG. 22), for example, the left hand holding the case 1 as illustrated in the center view in FIG. 22 may be detected with the first side surface electrodes AR, AL and/or the second side surface electrodes BR, BL, and a processing such as shifting the display of key array in the thumb direction and displaying the same may be executed. This allows the thumb or the hand that does not hold the device (the right hand in the case of the center view in FIG. 22) to operate a key input processing using the display of key array.

Further, in the processing (3) of setting an insensitive area (the right view in FIG. 22), for example, the following processing may be executed: the left hand holding the case 1 as is the case in the right view in FIG. 22, and how the fingers of the left hand are positioned, are detected with the first side surface electrodes AR, AL and/or the second side surface electrodes BR, BL, and the vicinities of the area touched by the fingers of the left hand other than the thumb are set to be the insensitive area.

In a case where the touch-panel-equipped display device is held by the left hand, as is the case in the right view in FIG. 22, it is rare that the touch panel is operated with the fingers of the left hand other than the thumb. By setting the areas RN1 to RN3 illustrated in FIG. 22 as the insensitive areas, therefore, an processing that a user does not intend to do can be appropriately prevented from being executed unintentionally.

Further, regarding the above-described embodiments, only the principal members required in the embodiments, among the constituent members, are described in a simplified manner. The configurations of the above-described embodiments, therefore, may include arbitrary constituent members that are not clearly described in the descriptions of the above-described embodiments. Further, in the above descriptions of the embodiments and the drawings, the size of each member does not necessarily represent the real size, dimension ratio, and the like. The size, dimension ratio, and the like, therefore, can be varied without departing from the scope of the present invention.

A specific configuration of the present invention is not limited to the above-described configurations of the embodiments, and various changes and corrections that do not depart from the scope of the invention can be applicable.

[Supplementary Notes]

The present invention also can be described as follows.

The first invention is directed to a touch-panel-equipped display device that includes a case, a display panel, a touch panel, and a side surface electrode part.

The display panel is provided in the case.

The touch panel includes an X-direction electrode part that is formed to extend in a first direction and is driven by a driving signal, and a Y-direction electrode part that is formed to extend in a second direction that intersects with the first direction, the Y-direction electrode part being intended to acquire a sense signal corresponding to an electric field change caused in the X-direction electrode part by the driving signal.

The side surface electrode part is arranged on the case. The side surface electrode part is provided in an area separated from the Y-direction electrode part on the touch panel, and can be electrically connected by capacitive coupling with the Y-direction electrode part on the touch panel.

In this touch-panel-equipped display device, the side surface electrode part can be electrically connected with the Y-direction electrode part by capacitive coupling. A change in the capacitive coupling when the side surface electrode part is touched by a finger or the like, therefore, is reflected in the sense signal acquired by the Y-direction electrode part. In other words, in the case of this touch-panel-equipped display device, a touch on the side surface electrode part can be detected according to the sense signal. This touch-panel-equipped display device, therefore, is capable of detecting a touch on the side surface electrode part by using hardware and signal processing for touch detection in a conventional touch panel.

In the case of this touch-panel-equipped display device, therefore, it is possible to detect a touch with the side surface electrode part arranged on the side surface of the case or the like at a high accuracy by a simple controlling operation, without any hardware such as expensive sensors the like being provided additionally.

The second invention is the first invention wherein the side surface electrode part is provided to be separated from the Y-direction electrode part at a distance of 0.1 mm or more and 2 mm or less therebetween.

With this configuration, therefore, in the touch-panel-equipped display device, the side surface electrode part is surely capacitively coupled with the Y-direction electrode part.

The third invention is directed to the first or second invention wherein the touch panel includes a plurality of the Y-direction electrode parts.

The Y-direction electrode parts are arranged in a first direction at a first pitch interval.

The side surface electrode part includes a plurality of side surface electrodes. The side surface electrodes are arranged in the first direction at an interval identical to the first pitch interval.

In the case of the touch-panel-equipped display device, since the pitch interval for the arrangement of the Y-direction electrode parts in the first direction, and the pitch interval for the arrangement of the side surface electrodes in the first direction, are identical, a capacitance change at the side surface electrode arranged at the touched position is appropriately detected through the Y-direction electrode part arranged in proximity to the side surface electrode (arranged at such a distance that they can be capacitively coupled). Consequently, in the case of the touch-panel-equipped display device, a touch on the side surface electrode can be detected at a high accuracy.

The fourth invention is the first or second invention wherein the touch panel includes a plurality of the Y-direction electrode parts.

The Y-direction electrode parts are arranged in a first direction at a first pitch interval.

The side surface electrode part includes a plurality of side surface electrodes. The side surface electrodes are arranged in the first direction at an interval different from the first pitch interval.

In the touch-panel-equipped display device, since the pitch interval for the arrangement of the Y-direction electrode parts in the first direction, and the pitch interval for the arrangement of the side surface electrodes in the first direction, are different, even in a case where a displacement occurs between the Y-direction electrode parts and the side surface electrodes due to manufacturing errors or the like, the probability that a capacitance change at a side surface electrode arranged at a touched position can be appropriately detected through a Y-direction electrode part arranged in proximity to the side surface electrode (arranged at such a distance that they can be capacitively coupled) can be increased. Consequently, in the case of the touch-panel-equipped display device, a touch on the side surface electrode can be detected at a high accuracy.

The fifth invention is the third or fourth invention wherein each of the side surface electrodes, when viewed in a plan view, is arranged at a position that includes an extension line in the second direction in which the Y-direction electrode part extends.

The sixth invention is any one of the third to fifth inventions wherein the side surface electrode includes a first sensitivity area having a first width, and a second sensitivity area having a second width that is greater than the first width.

According this, in this touch-panel-equipped display device, the second sensitivity area having a high sensitivity can be arranged at a predetermined position, whereby a touch at the predetermined position can be detected at a high accuracy. Further, in this touch-panel-equipped display device, since the first sensitivity area having a low sensitivity can be provided, for example, a part at which a touch that a user does not intend to make tends to be induced may be set to be the first sensitivity area, whereby the detection of a touch that a user does not intend to make can be appropriately prevented.

The seventh invention is the fifth or sixth invention wherein each of the side surface electrodes includes a first side surface electrode and a second side surface electrode.

The second side surface electrode is provided in an area separated from the first side surface electrode, and can be electrically connected by capacitive coupling with the first side surface electrode.

The second side surface electrode is provided in such an area separated from the Y-direction electrode part that the second side surface electrode can be electrically connected by capacitive coupling with the Y-direction electrode part of the touch panel.

Thus, the side surface electrode can be composed of the first side surface electrode and the second side surface electrode. This makes it possible to, for example, provide the first side surface electrode on the case and provide the second side surface electrode on a cover attached to the case.

INDUSTRIAL APPLICABILITY

With the present invention, such a touch-panel-equipped display device can be realized that a touch on a side surface of a case can be detected at a high accuracy by a simple controlling operation, without any hardware such as expensive sensors being provided additionally. The present invention, therefore, is useful in the touch panel-related industry field, and can be implemented in this field.

DESCRIPTION OF REFERENCE NUMERALS 1000, 1000B, 1000C, 1000D, 1000E, 1000F, 2000, 2000A, 2000B, 3000, 3000A, 3000B, 3000C: touch-panel-equipped display device
1: case
3, LCD: display panel
4, TP: touch panel
X1 to X6: X-direction electrode
Y1 to Y8: Y-direction electrode
6: touch panel controller
7: transmission unit
8: reception unit
AR, AL: first side surface electrode
BR, BL: second side surface electrode

The invention claimed is:

1. A touch-panel-equipped display device comprising:
   a case;
   a display panel provided in the case;
   a touch panel that includes an X-direction electrode that extends in a first direction and is driven by a driving signal, and a Y-direction electrode that extends in a second direction that intersects with the first direction, the Y-direction electrode acquiring a sense signal corresponding to an electric field change in the X-direction electrode by the driving signal;
   a touch panel controller that identifies a touch position by interpreting the sense signal caused by the electrical field change in the X-direction electrode; and
   a side surface electrode that is arranged on the case, separated by a distance from the Y-direction electrode on the touch panel, and structured to be electrically connected by capacitive coupling to the Y-direction electrode on the touch panel, wherein
   the side surface electrode is separated from the Y-direction electrode at a distance of 0.1 mm or more and 2 mm or less therebetween,
   the touch panel includes a plurality of Y-direction electrodes, the Y-direction electrodes are arranged in a first direction at a first pitch interval, the side surface electrode includes a plurality of side surface electrodes, and the side surface electrodes are arranged in the first direction at a second pitch interval different from the first pitch interval.

2. The touch-panel-equipped display device according to claim 1, wherein each of the side surface electrodes, when viewed in a plan view, is arranged such that a center position in the first direction of a corresponding one of the Y-direction electrodes is within a position of the side surface electrodes in the first direction.

3. The touch-panel-equipped display device according to claim 2, wherein each of the side surface electrodes includes:
a first side surface electrode; and
a second side surface electrode that is provided in an area separated from the first side surface electrode, and structured to be electrically connected by capacitive coupling with the first side surface electrode, and the second side surface electrode is arranged in such an area separated from the Y-direction electrode that the second side surface electrode can be electrically connected by capacitive coupling with the Y-direction electrode of the touch panel.

4. The touch-panel-equipped display device according to claim 1, wherein the side surface electrode includes a first sensitivity area having a first width, and a second sensitivity area having a second width that is greater than the first width.

* * * * *